US011026215B2

(12) United States Patent
Niu et al.

(10) Patent No.: US 11,026,215 B2
(45) Date of Patent: Jun. 1, 2021

(54) UE SPECIFIC SEARCH SPACE AND A COMMON SEARCH SPACE IN A WIDE COVERAGE ENHANCEMENT

(71) Applicant: Apple Inc., Cupertino, CA (US)

(72) Inventors: Huaning Niu, San Jose, CA (US); Wenting Chang, Beijing (CN); Salvatore Talarico, Sunnyvale, CA (US); Anthony Lee, San Diego, CA (US)

(73) Assignee: Apple Inc., Cupertino, CA (US)

(*) Notice: Subject to any disclaimer, the term of this patent is extended or adjusted under 35 U.S.C. 154(b) by 60 days.

(21) Appl. No.: 16/133,360

(22) Filed: Sep. 17, 2018

(65) Prior Publication Data
US 2019/0104503 A1 Apr. 4, 2019

Related U.S. Application Data

(60) Provisional application No. 62/559,373, filed on Sep. 15, 2017, provisional application No. 62/574,086, filed on Oct. 18, 2017, provisional application No. 62/573,976, filed on Oct. 18, 2017.

(51) Int. Cl.
| | | |
|---|---|---|
| *H04W 72/04* | (2009.01) | |
| *H04W 72/12* | (2009.01) | |
| *H04W 88/02* | (2009.01) | |
| *H04L 5/00* | (2006.01) | |
| *H04L 25/02* | (2006.01) | |

(52) U.S. Cl.
CPC ......... *H04W 72/042* (2013.01); *H04L 5/0048* (2013.01); *H04L 25/0202* (2013.01); *H04W 72/1289* (2013.01); *H04W 72/12* (2013.01); *H04W 88/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,826,540 | B1 * | 11/2017 | Li | H04W 72/10 |
| 2012/0063386 | A1 * | 3/2012 | Park | H04B 7/2606 370/315 |
| 2012/0178360 | A1 * | 7/2012 | Park | H04B 7/2606 455/7 |

(Continued)

OTHER PUBLICATIONS

3GPP, "Technical Specification Group Radio Access Network; Evolved Universal Terrestrial Radio Access (E-UTRA); Physical layer procedures (Release 14)," 3GPP TS 36.213 V14.3.0 (Jun. 2017), Lte Advanced Pro, 460 pages.

*Primary Examiner* — Yee F Lam
(74) *Attorney, Agent, or Firm* — Sterne, Kessler, Goldstein & Fox P.L.L.C.

(57) ABSTRACT

This disclosure relates to implementations to support UE-specific search space (UESS) for wide coverage enhancement (WCE). One implementation relates to an apparatus of a user equipment (UE) comprising: an interface configured to receive configuration information of a UE specific Search Space (UESS) and a common search space (CSS) for enhanced Physical Downlink Control Channel (ePDCCH) from a radio-frequency (RF) circuitry; and a processor configured to monitor the UESS and the CSS for ePDCCH transmission; wherein the interface and/or the processor is adaptable to support a wideband coverage enhancement (WCE).

18 Claims, 7 Drawing Sheets

(56) References Cited

U.S. PATENT DOCUMENTS

| | | | | |
|---|---|---|---|---|
| 2014/0016596 | A1* | 1/2014 | Kim | H04L 5/001 |
| | | | | 370/329 |
| 2014/0098761 | A1* | 4/2014 | Lee | H04W 72/005 |
| | | | | 370/329 |
| 2014/0192733 | A1* | 7/2014 | Charbit | H04L 5/0053 |
| | | | | 370/329 |
| 2015/0181440 | A1* | 6/2015 | Chen | H04L 1/1816 |
| | | | | 370/329 |
| 2015/0372796 | A1* | 12/2015 | Lee | H04W 48/00 |
| | | | | 370/330 |
| 2016/0119946 | A1* | 4/2016 | Dai | H04L 1/0072 |
| | | | | 370/329 |
| 2016/0174247 | A1* | 6/2016 | Ruiz Delgado | H04W 28/18 |
| | | | | 370/329 |
| 2016/0219587 | A1* | 7/2016 | Lin | H04L 5/0044 |
| 2016/0255609 | A1* | 9/2016 | Kim | H04B 7/0413 |
| | | | | 370/203 |
| 2016/0295558 | A1* | 10/2016 | Hussain | H04L 5/0053 |
| 2017/0279646 | A1* | 9/2017 | Yi | H04L 5/0053 |
| 2017/0311286 | A1* | 10/2017 | Yi | H04L 5/001 |
| 2017/0332365 | A1* | 11/2017 | Lin | H04L 5/0091 |
| 2017/0332377 | A1* | 11/2017 | Tseng | H04W 72/0413 |
| 2017/0332386 | A1* | 11/2017 | Li | H04W 72/1242 |
| 2017/0373793 | A1* | 12/2017 | Yerramalli | H04L 1/0052 |
| 2018/0049175 | A1* | 2/2018 | Bagheri | H04L 41/08 |
| 2018/0069593 | A1* | 3/2018 | Yi | H04B 1/707 |
| 2018/0115933 | A1 | 4/2018 | Radulescu et al. | |
| 2018/0132245 | A1* | 5/2018 | Yerramalli | H04W 72/042 |
| 2018/0192354 | A1* | 7/2018 | Yi | H04L 5/0094 |
| 2018/0212722 | A1* | 7/2018 | Wong | H04L 5/0091 |
| 2019/0090178 | A1* | 3/2019 | Liu | H04W 74/0833 |
| 2019/0124663 | A1* | 4/2019 | Liu | H04W 76/10 |

* cited by examiner

Example (a). Absolute starting subframe for SIB1 transmission

Example (b). floating starting subframe for SIB1 transmission

UE SPECIFIC SEARCH SPACE AND A COMMON SEARCH SPACE IN A WIDE COVERAGE ENHANCEMENT

RELATED APPLICATIONS

This application claims the benefit of priority under 35 U.S.C. § 119(e) of U.S. Provisional Application Ser. No. U.S. 62/559,373, filed Sep. 15, 2017, of Provisional Application Ser. No. U.S. 62/574,086, filed Oct. 18, 2017, and of Provisional Application Ser. No. U.S. 62/573,976, filed Oct. 18, 2017. The disclosures of the provisional applications are incorporated herein by reference in their entirety.

FIELD

Implementations of this disclosure generally relate to the field of Long Term Evolution (LTE) operation in an unlicensed spectrum in MulteFire. More specifically, implementations of this disclosure relate to wideband coverage enhancement (WCE) for MulteFire. Implementations of this disclosure further relate to Internet of Things (IoT) operating in an unlicensed spectrum.

BACKGROUND

There is emerging interest in the operation of LTE systems in an unlicensed spectrum. IoT is envisioned as a significantly important technology component, and the 3rd Generation Partnership Project (3GPP) has standardized two designs to support IoT services—enhanced Machine Type Communication (eMTC) and NarrowBand IoT (NB-IoT). The number of cases in which devices are deployed deep inside buildings that require coverage enhancement (CE) in comparison to the defined LTE cell coverage footprint is substantial.

For the coverage enhancement of UE, the performance of ePDCCH is enhanced so as to serve the UEs in the edge of coverage or UE with poor link quality. On the other hand, for the WCE users, blind detection cannot be increased to maintain the UE's complexity.

BRIEF DESCRIPTION OF THE DRAWINGS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the disclosure.

However, it will be apparent to those skilled in the art having the benefit of the present disclosure that the various aspects of the disclosure may be practiced in other examples that depart from these specific details. In certain instances, descriptions of well-known devices, circuits, and methods are omitted so as not to obscure the description of the disclosure with unnecessary detail.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Figure 1:
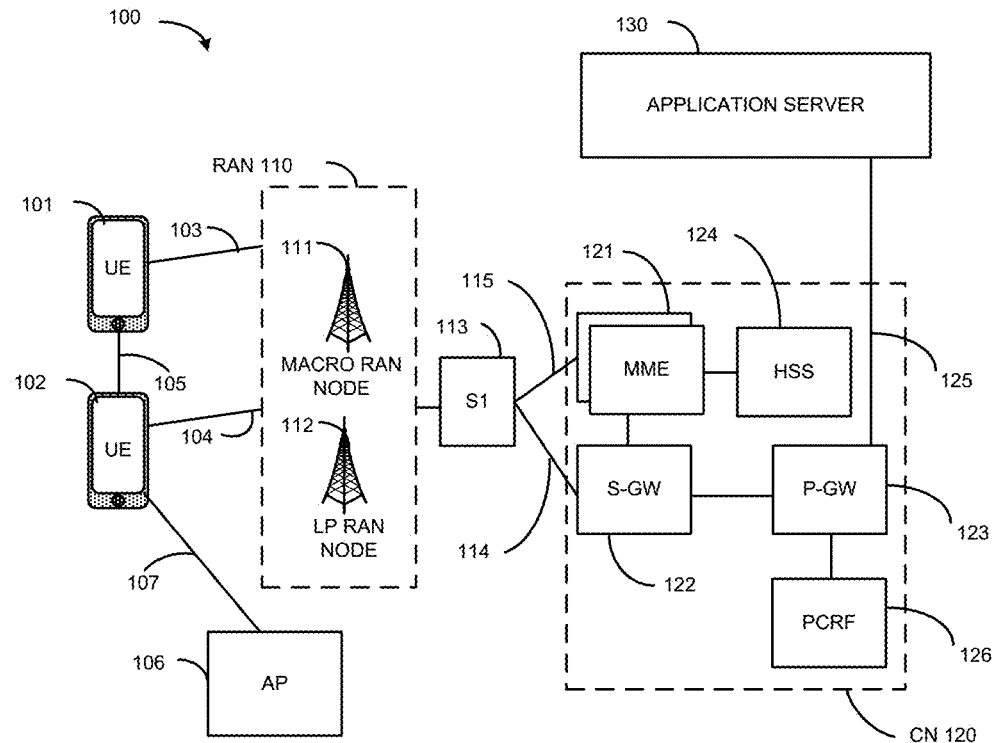
FIG. 1 depicts an architecture of a system of a network in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and may be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) may be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and may be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 may be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid may be used for downlink transmissions from any of the RAN nodes 111 and 112 to the UEs 101 and 102, while uplink transmissions can utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently may be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the downlink control information (DCI) and the channel condition. There may be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMES 121, the S-GW 122, the Packet Data Network (PDN) Gateway (P-GW) 123, and a home subscriber server (HSS) 124. The MMES 121 may be similar in function to the control plane of legacy Serving General Packet Radio Service (GPRS) Support Nodes (SGSN). The MMES 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
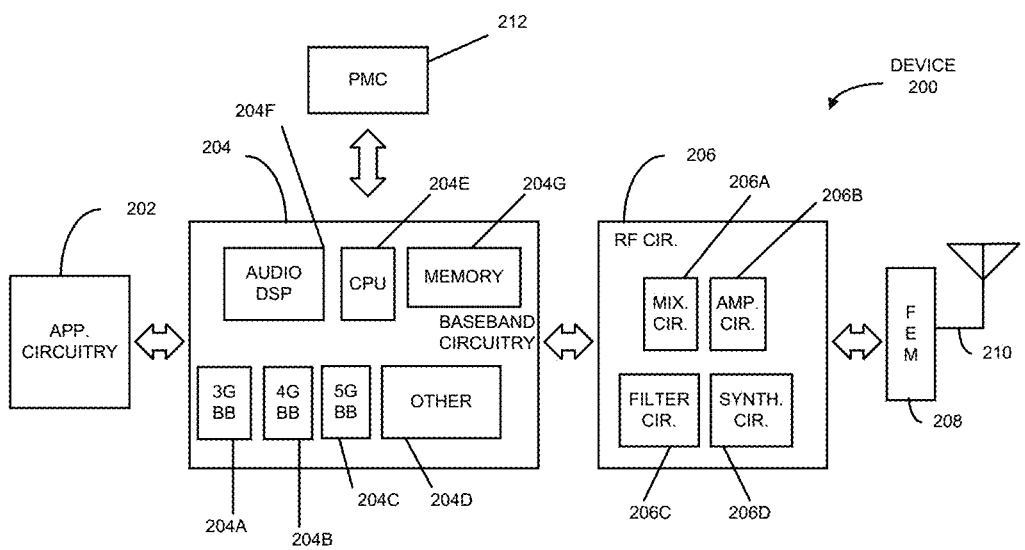
FIG. 2 depicts example components of a device in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it transitions back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
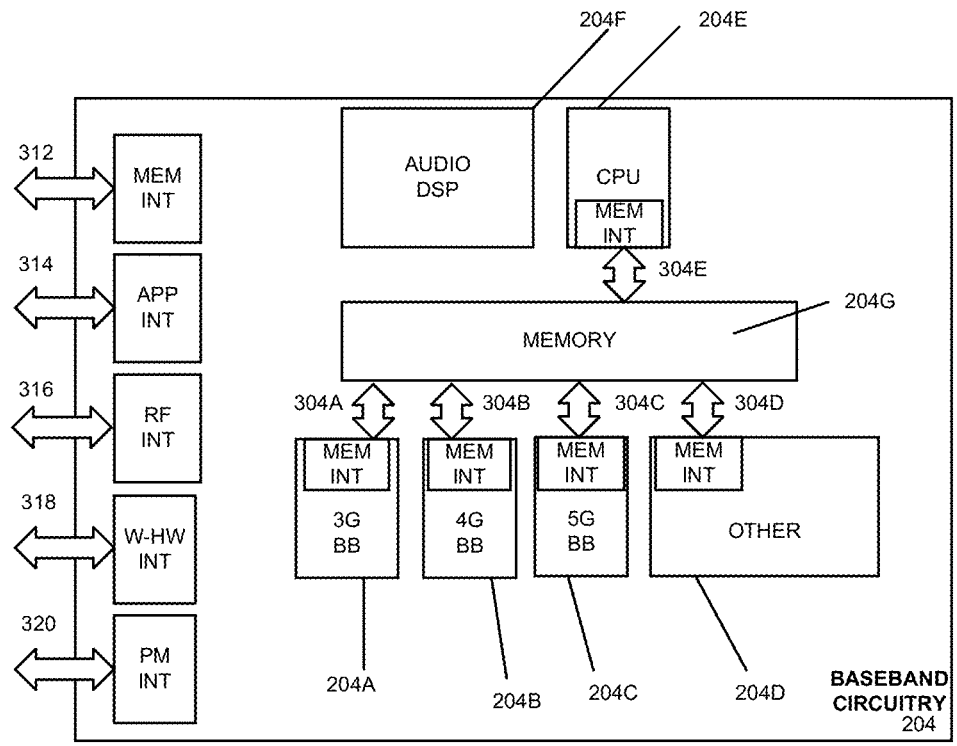
FIG. 3 depicts example interfaces of baseband circuitry in accordance with some embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
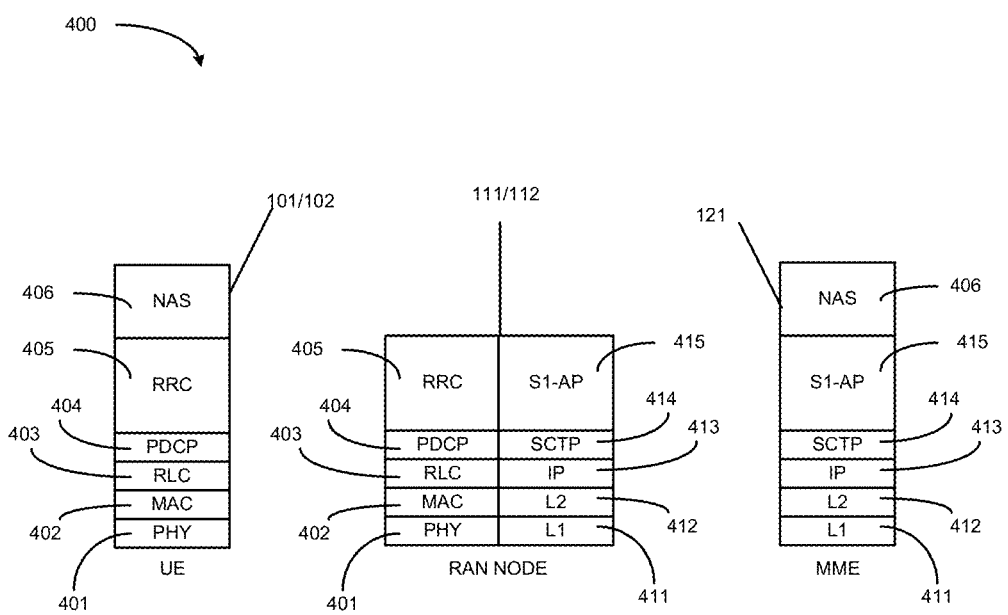
FIG. 4 is an illustration of a control plane protocol stack in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
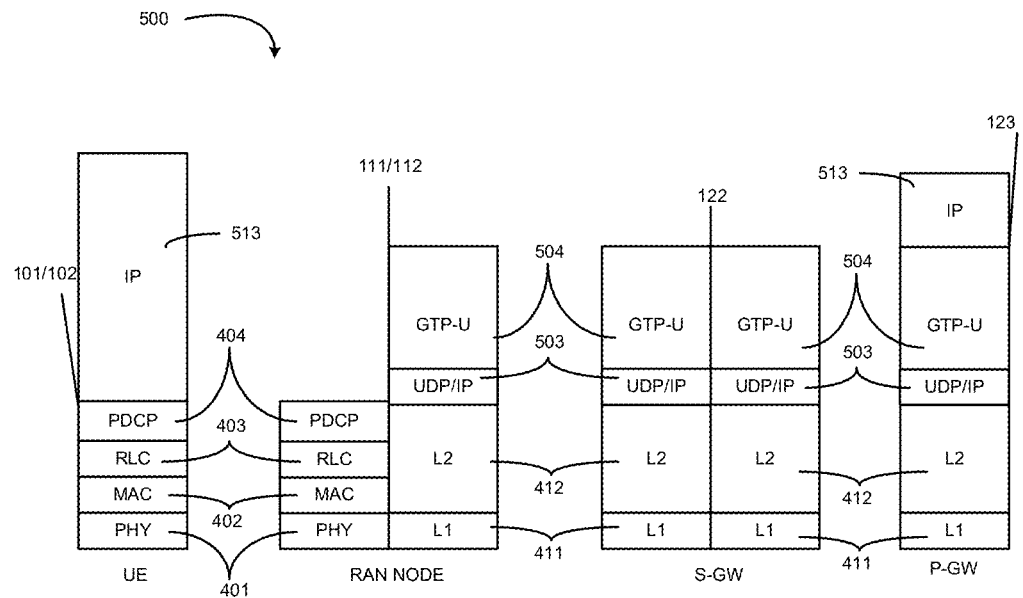
FIG. 5 is an illustration of a user plane protocol stack in accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, the PDCP layer 404.

The General Packet Radio Service (GPRS) Tunneling Protocol for the user plane (GTP-U) layer 504 may be used for carrying user data within the GPRS core network and between the radio access network and the core network. The user data transported may be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
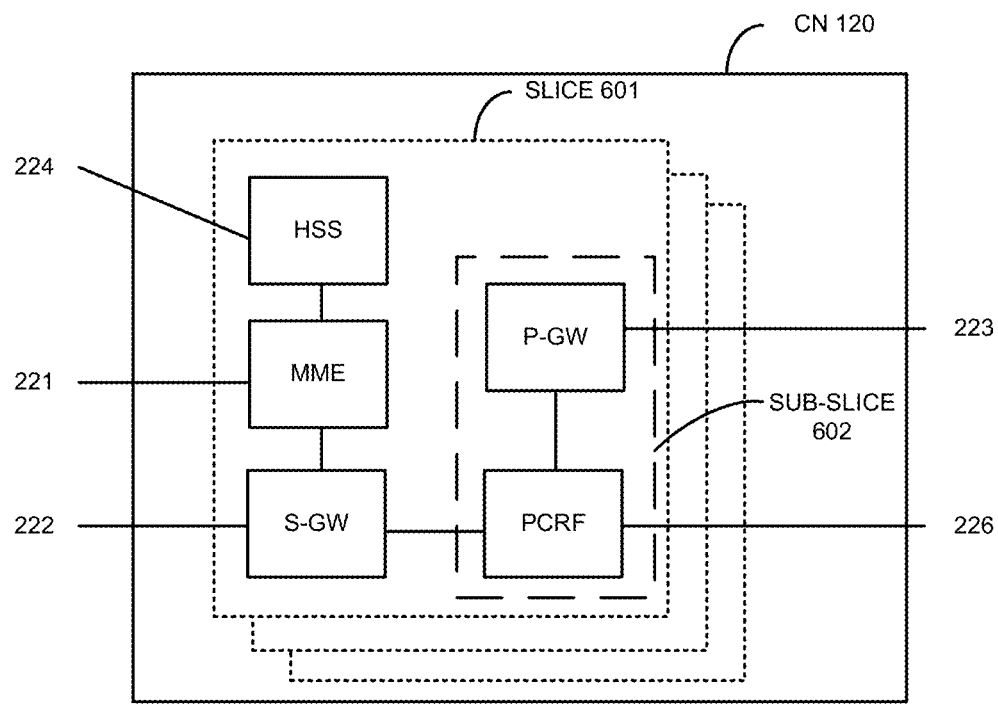
FIG. 6 illustrates components of a core network in accordance with some embodiments.

FIG. 6 illustrates components of a core network in accordance with some embodiments. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 120 may be referred to as a network slice 601. A logical instantiation of a portion of the CN 120 may be referred to as a network sub-slice 602 (e.g., the network sub-slice 602 is shown to include the PGW 123 and the PCRF 126).

NFV architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

Figure 7:
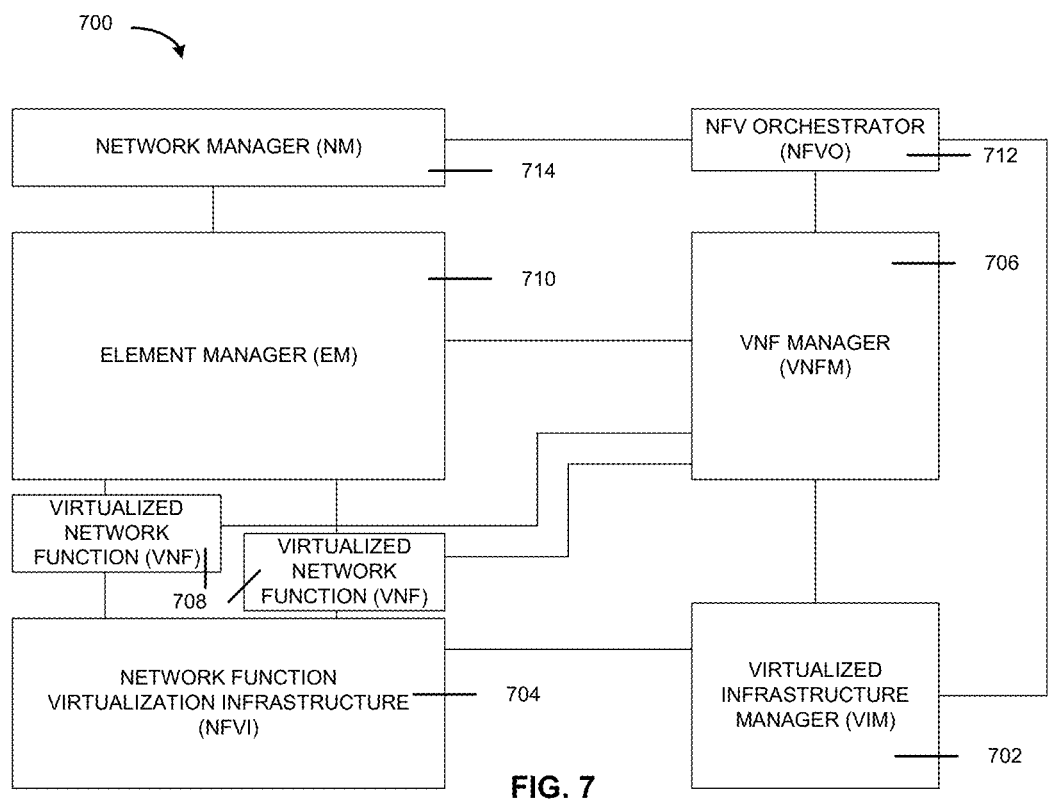
FIG. 7 is a block diagram illustrating components, according to some example embodiments, of a system 700 to support NFV.

FIG. 7 is a block diagram illustrating components, according to some example embodiments, of a system 700 to support NFV. The system 700 is illustrated as including a virtualized infrastructure manager (VIM) 702, a network function virtualization infrastructure (NFVI) 704, a VNF manager (VNFM) 706, virtualized network functions (VNFs) 708, an element manager (EM) 710, an NFV Orchestrator (NFVO) 712, and a network manager (NM) 714.

The VIM 702 manages the resources of the NFVI 704. The NFVI 704 can include physical or virtual resources and applications (including hypervisors) used to execute the system 700. The VIM 702 may manage the life cycle of virtual resources with the NFVI 704 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 706 may manage the VNFs 708. The VNFs 708 may be used to execute EPC components/functions. The VNFM 706 may manage the life cycle of the VNFs 708 and track performance, fault and security of the virtual aspects of VNFs 708. The EM 710 may track the performance, fault and security of the functional aspects of VNFs 708. The tracking data from the VNFM 706 and the EM 710 may comprise, for example, performance measurement (PM) data used by the VIM 702 or the NFVI 704. Both the VNFM 706 and the EM 710 can scale up/down the quantity of VNFs of the system 700.

The NFVO 712 may coordinate, authorize, release and engage resources of the NFVI 704 in order to provide the requested service (e.g., to execute an EPC function, component, or slice). The NM 714 may provide a package of end-user functions with the responsibility for the management of a network, which may include network elements with VNFs, non-virtualized network functions, or both (management of the VNFs may occur via the EM 710).

Figure 8:
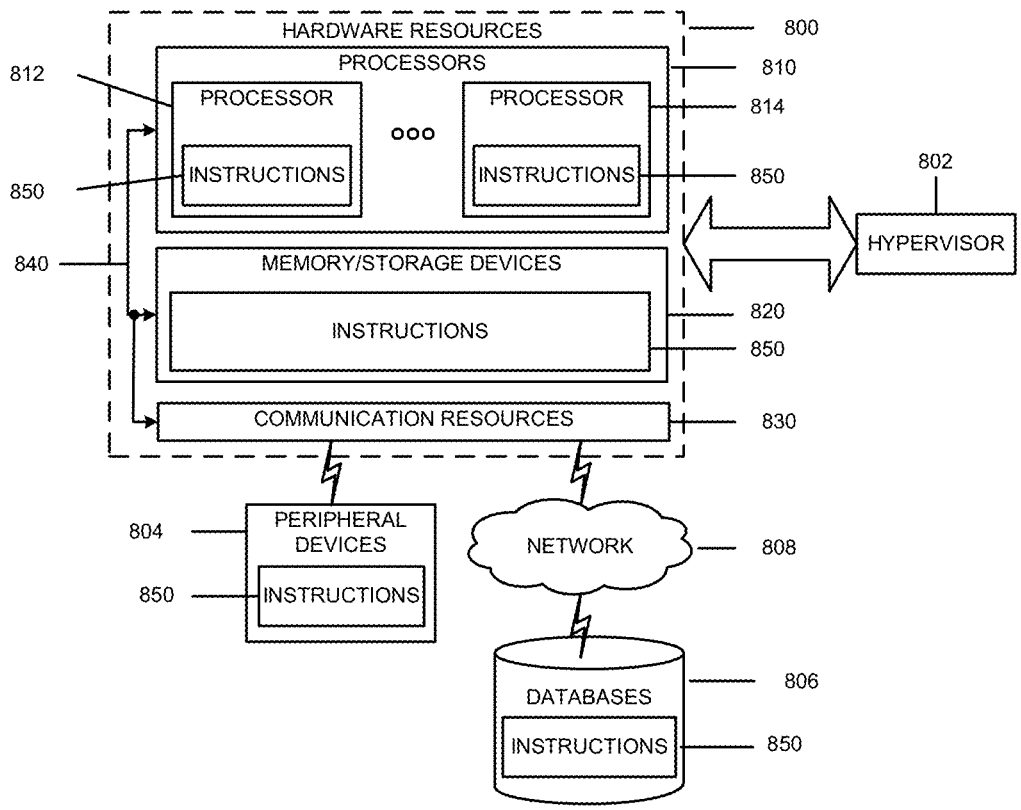
FIG. 8 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Internet of Things (IoT)

IoT is envisioned as a significantly important technology component that has great potential and that may change our daily life entirely by enabling connectivity between and among a huge of devices. IoT has wide applications in various scenarios, including smart cities, smart environment, smart agriculture, and smart health systems.

The 3GPP has standardized two designs to support IoT services—enhanced Machine Type Communication (eMTC) and NarrowBand IoT (NB-IoT). As eMTC and NB-IoT UEs will be deployed in huge numbers, lowering the cost of these UEs is a key enabler for implementation of IoT. Also, low power consumption is desirable to extend the life time of the battery. In addition, the number of cases in which devices are deployed deep inside buildings that require coverage enhancement (CE) in comparison to the defined LTE cell coverage footprint is substantial. In summary, eMTC, and NB-IoT techniques are designed to ensure that the UEs have low cost, low power consumption, and enhanced coverage.

LTE Operation in Unlicensed Spectrum

Both Rel-13 eMTC and NB-IoT operate in the licensed spectrum. On the other hand, the scarcity of licensed spectrum in low frequency band results in a deficit in the data rate boost. Thus, interest in the operation of LTE systems in unlicensed spectrum is emerging.

Potential LTE operations in unlicensed spectrum include but are not limited to the Carrier Aggregation based Licensed Assisted Access/enhanced Licensed Assisted Access (LAA/eLAA) systems, LTE operation in the unlicensed spectrum via dual connectivity (DC), and the standalone LTE system in the unlicensed spectrum, where LTE-based technology solely operates in unlicensed spectrum without requiring an "anchor" in a licensed spectrum—called MulteFire.

To extend the benefits of LTE IoT designs into unlicensed spectrum, MulteFire 1.1 is expected to specify the design for Unlicensed-IoT (U-IoT). The current disclosure falls in the scope of the U-IoT systems, with focus on the eMTC based a U-IoT design. Note that similar approaches may be used with an NB-IoT based U-IoT design as well.

Aspects of various embodiments may include search space design and subframe configurations for Machine-Type Communications Physical Downlink Control Channel (MPDCCH). Here, the eMTC-U system is characterized by a frequency hopping where the hopping sequence depends on the carrier sensing procedure success.

Regulations in Unlicensed Spectrum

The unlicensed frequency band of interest in this disclosure is the 2.4 GHz band. For global availability, the design should abide by the regulations in different regions, e.g. the regulations set out by Federal Communications Commission (FCC) in US and the regulations set out by European Telecommunications Standards Institute (ETSI) in Europe. Based on these regulations, frequency hopping is more appropriate than other forms of modulations, due to more relaxed power spectrum density (PSD) limitation and co-existence with other unlicensed band technology such as Bluetooth and WiFi. Specifically, frequency hopping has no PSD limit while other wide band modulations have PSD limit of 10 dBm/MHz in regulations set out by ETSI. The low PSD limit would result in limited coverage. Thus, this disclosure focuses on the U-IoT with frequency hopping.

PDSCH Transmission and SI in PDSCH Frequency Hopping IoT System

In the unlicensed frequency hopping system, the whole bandwidth is 1.4 MHz. Specifically, Transmission Mode 9 (TM9) and MTC PDCCH (MPDCCH) are demodulated based on the Demodulation Reference Signal (DMRS) instead of Cell Reference Signal (CRS). As a result, the 10% overhead due to the always-on signal will affect performance. In order to solve this problem, a PDSCH transmission for frequency hopping IoT is proposed. Also, in the legacy system, the System Information (SI) transmitted on the distributed PDSCH subframes will limit downlink subframes for SI transmission due to the agreement "one downlink is finished within the dwell time of one channel". In order to solve this problem, PDSCH transmission, including unicast and SI are proposed in this disclosure.

Search Space Frequency Hopping System

In the unlicensed eMTC-U system, the downlink, including the DCI and the PDSCH is restricted to within one dwell time. This will impact the search space design for DCI, since there is no guaranteed downlink subframe or uplink subframe. On the other hand, it is advisable to transmit the downlink DCI at the beginning, then PDSCH and PUSCH. To support a simplified Random Access Channel (RACH) procedure, the corresponding parameters are to be configured.

Scheduling Rule

Figure 9:
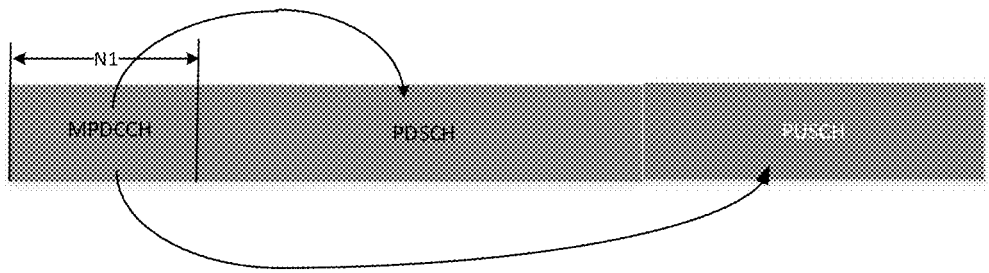
FIG. 9 depicts an example of scheduling in accordance with some embodiments.

FIG. 9 depicts an example of scheduling in accordance with some embodiments.

In embodiments, as shown in FIG. 9, the MPDCCH may be restricted with the starting N1 downlink subframes:

N1 is configured by eNB through high layer signaling, which is less than the length of dwell time of the data channel;

A subframe offset may be explicitly configured in the corresponding DCI, for either PDSCH or PUSCH scheduling.

In embodiments, the time position for MPDCCH search space may span the whole downlink subframe within one data channel. The legacy eMTC system may be reused, where the starting subframe is associated with the corresponding repetition times of MPDCCH. The starting subframe may be a floating subframe after the presence signal. Or it may be an absolute subframe.

In embodiments, one DCI can schedule one or more than one PDSCH/PUSCH subframes. The PDSCH/PUSCH may be either repeated or not. The scheduled multiple PDSCH (s)/PUSCH(s) have contiguous HARQ IDs, while the HARQ of the first scheduled PDSCH/PUSCH is explicitly scheduled in the DCI.

Search Space

The repetition level to monitor in a SS is indicated via the configuration of the maximum repetition level to monitor, $R_{max}$. In embodiments, $R_{max}$ may be a fixed value, e.g., 8 or 16. The search space may be defined based on triplet {AL, RL, #BDs}. The term "BD" refers to "blind decoding", the term "RL" refers to "repetition level", and the term "AL" refers to "aggregation level".

SS for UESS

In embodiments, the maximum repetition of user equipment (UE) search space (SS) ("UE-SS", "UESS", or the like) is 8. The $R_{max}$ may be {1, 2, 4, 8}, which is configured by eNB through RRC signaling. For each UE, the search space is blindly detected with the SS with RL<=$R_{max}$. The SS for UESS is illustrated by Table 1.

TABLE 1 an example of UESS with maximum 8 time repetition

|  |  | {AL, RL, #BDs} |
|---|---|---|
| 2 + 4 PRBs | set with 2PRBs | {2, 1, 1}, {4, 1, 1} |
|  |  | {4, 2, 1}, {8, 2, 1} |
|  | Set with 4 PRBs | {8, 1, 2}, {16, 1, 1} |
|  |  | {8, 2, 2}, {16, 2, 1} |
|  |  | {8, 4, 1}, {16, 4, 1} |
|  | 2 + 4 PRB set | {24, 1, 1}, {24, 2, 1}, {24, 4, 1}, {24, 8, 1} |
| 2 PRBs |  | {2, 1, 2}, {4, 1, 1}, {8, 1, 1} |
|  |  | {2, 2, 2}, {4, 2, 1}, {8, 2, 1} |
|  |  | {2, 4, 2}, {4, 4, 1}, {8, 4, 1} |
|  |  | {2, 8, 2}, {4, 8, 1}, {8, 8, 1} |
| 4 PRBs |  | {2, 1, 1}, {4, 1, 1}, {8, 1, 1}, {16, 1, 1} |
|  |  | {2, 2, 1}, {4, 2, 1}, {8, 2, 1}, {16, 2, 1} |
|  |  | {2, 4, 1}, {4, 4, 1}, {8, 4, 1}, {16, 4, 1} |
|  |  | {2, 8, 1}, {4, 8, 1}, {8, 8, 1}, {16, 8, 1} |

In embodiments, the maximum repetition of UE SS is 8. The $R_{max}$ may be {1, 2, 4, 8}, which is configured by eNB through RRC signaling. For each UE, the search space is blindly detected with the SS with RL<=$R_{max}$. The SS for UESS is illustrated by Table 2.

TABLE 2 an example of UESS with maximum 8 time repetition

{AL, RL, #BDs}

| | | |
|---|---|---|
| 2 + 4 PRBs | set with 2PRBs | {2, 1, 1}, {4, 1, 1} |
| | | {4, 2, 1}, {8, 2, 1} |
| | Set with 4 PRBs | {8, 1, 2}, {16, 1, 1} |
| | | {8, 2, 2}, {16, 2, 1} |
| | | {8, 4, 1}, {16, 4, 1} |
| | 2 + 4 PRB set | {24, 1, 1}, {24, 2, 1}, {24, 4, 1}, {24, 8, 1} |
| 2 PRBs | | {2, 1, 2}, {4, 1, 1}, {8, 1, 1} |
| | | {2, 2, 2}, {4, 2, 1}, {8, 2, 1} |
| | | {2, 4, 2}, {4, 4, 1}, {8, 4, 1} |
| | | {2, 8, 2}, {4, 8, 1}, {8, 8, 1} |
| 4 PRBs | | {2, 1, 1}, {4, 1, 1}, {8, 1, 1}, {16, 1, 1} |
| | | {2, 2, 1}, {4, 2, 1}, {8, 2, 1}, {16, 2, 1} |
| | | {2, 4, 1}, {4, 4, 1}, {8, 4, 1}, {16, 4, 1} |
| | | {2, 8, 1}, {4, 8, 1}, {8, 8, 1}, {16, 8, 1} |

In embodiments, as shown in Table 3, only 2+4 physical resource block (PRB) sets are configured, where besides the UESS, the maximum repetition may be different UEs may be configured with different 2 PRBs, and 4 PRBs. The BDs for UESS may be further simplified, that is maximum aggregation level may be time repeated, while the other aggregation levels, other than the maximum, no time repetition is necessary.

TABLE 3

An example of UESS with maximum 8 time repetition

{AL, RL, #BDs}

| | | |
|---|---|---|
| 2 + 4 PRBs | set with 2PRBs (3BDs) | {2, 1, 2}, {4, 1, 1} |
| | set with 4 PRBs (7~9 BDs) | {2, 1, 2/3/4}, {4, 1, 2/3/4}, {8, 1, 2}, {16, 1, 1} |
| | 2 + 4 PRB set (4BDs) | {24, 1, 1}, {24, 2, 1}, {24, 4, 1}, {24, 8, 1} |

In embodiments, the maximum repetition is 16, where $R_{max}$ may be {1, 2, 4, 8, 16}, which is configured by eNB through RRC signaling. The search space is illustrated by Table 4.

TABLE 4

An example of UESS with maximum $R_{max}$ time repetition

{AL, RL, #BDs}

| | | |
|---|---|---|
| 2 + 4 PRBs | set with 2PRBs | {2, R1, 1}, {4, R1, 1} |
| | | {4, R2, 1}, {8, R2, 1} |
| | Set with 4 PRBs | {8, R1, 2}, {16, R1, 1} |
| | | {8, R2, 2}, {16, R2, 1} |
| | | {8, R3, 1}, {16, R3, 1} |
| | 2 + 4 PRB set | {24, R1, 1}, {24, R2, 1}, {24, R3, 1}, {24, R4, 1} |
| 2 PRBs | | {2, R1, 2}, {4, R1, 1}, {8, R1, 1} |
| | | {2, R2, 2}, {4, R2, 1}, {8, R2, 1} |
| | | {2, R3, 2}, {4, R3, 1}, {8, R3, 1} |
| | | {2, R4, 2}, {4, R4, 1}, {8, R4, 1} |
| 4 PRBs | | {2, R1, 1}, {4, R1, 1}, {8, R1, 1}, {16, R1, 1} |
| | | {2, R2, 1}, {4, R2, 1}, {8, R2, 1}, {16, R2, 1} |
| | | {2, R3, 1}, {4, R3, 1}, {8, R3, 1}, {16, R3, 1} |
| | | {2, R4, 1}, {4, R4, 1}, {8, R4, 1}, {16, R4, 1} |

Alternatively, as shown in Table 5, only 2+4 PRB sets are configured, where besides the UESS, the maximum repetition may be different UEs may be configured with different 2 PRBs, and 4 PRBs. The BDs for UESS may be further simplified, that is maximum aggregation level may be time repeated, while the other aggregation levels, other than the maximum, no time repetition is necessary.

TABLE 5

An example of UESS with maximum 8 time repetition

{AL, RL, #BDs}

| | | |
|---|---|---|
| 2 + 4 PRBs | set with 2PRBs (3BDs) | {2, R1, 2}, {4, R1, 1} |
| | set with 4 PRBs (7~9 BDs) | {2, R1, 2/3/4}, {4, R1, 2/3/4}, {8, R1, 2}, {16, R1, 1} |
| | 2 + 4 PRB set (4BDs) | {24, R1, 1}, {24, R2, 1}, {24, R3, 1}, {24, R4, 1} |

Where:
$R_{max} = 1$ : R1 = 1
$R_{max} = 2$ : R1 = 1, R2 = 2
$R_{max} = 4$ : R1 = 1, R2 = 2, R3 = 4
$R_{max} >= 8$ : R1 = $R_{max}/8$, R2 = $R_{max}/4$, R3 = $R_{max}/2$, R4 = $R_{max}$ SS for CSS Type0 cell-specific common search space (CSS) (also referred to as "common search space") may comprise: a same scrambling, PRB as for user search space (USS) (e.g., UESS); fallback and DCI format 3/3A; 4BDs, (8,r1,1), (8,r2,1), (8,r3,1), (8,r4,1) for 2 RBs; (16, r1,1), (16,r2,1), (16,r3,1), (16,r4,1) for 4 RBs; (24,r1,1), (24,r2,1), (24,r3,1), (24,r4,1) for 2+4 RBs.

Type1 CSS may comprise: a paging/direct indication; DCI format 6-2; and 4 BDs, that is (24,r1,1), (24,r2,1), (24,r3,1), (24,r4,1).

Type2 CSS may comprise: random access, monitoring RAR/Msg3 Retrans/RRC_connection_setup; 7 BDs, that is (24,r1,1), (24,r2,1), (24,r3,1), (24,r4,1) and/or (16,r1,1), (16,r2,1), (16,r3,1).

In some embodiments, there is no type 1 and type 2 CSS, while the type 1 and type 2 merge into one type, that new type 1 CSS.

In some embodiments, the common search space for CSS, e.g., for new type 1 CSS comprises 6 PRBs with distributed transmission; 4 BDs, that is {(24, r1, 1), (24, r2, 1), (24, r3, 1), (24, r4, 1)}. Or it comprises 7 BDs, that is {(24, r1, 1), (24, r2, 1), (24, r3, 1), (24, r4, 1), (16, r)}; and the maximum repetition may be configured by eNB, or by default as 8 or 16, where the following difference of repetition times.

In some embodiments, the paging/random access/direct indication may use the same maximum repetition times, rmax (see e.g., Table 6). In embodiments, the system information (SI) may be scheduled by DCI in CSS. To save overhead related to the DCI transmission, the time resource for SI transmission may be indicated by eNB through high layer signaling. Alternatively, DCI may be conveyed using DCI for unicast DCI scheduling, dedicated DCI for paging, and/or a new type of (type1) DCI. The maximum repetition for DCI reuses that number for DCI scheduling, or is separately configured.

TABLE 6

| $r_{max}$ | r1 | r2 | r3 | r4 |
|---|---|---|---|---|
| 16 | 1 | 4 | 8 | 16 |
| 8 | 1 | 2 | 4 | 8 |

Embodiments may be directed to the PDSCH and the system information, including the essential System Information Blocks (SIB), remaining SIB1-BR, and other SIBx. Here, the enhanced Machine Type communication (eMTC)-U system may be characterized by a frequency hopping where the hopping sequence may depend on the carrier sensing procedure success.

These embodiments may allow PDSCH and SI transmission with guaranteed coverage enhancement for frequency hopping IoT system.

1) Embodiments may include the PDSCH transmission and the corresponding reference signal. Also, the system information transmission on the PDSCH may be based on the contiguous downlink/uplink subframe configuration.
2) Embodiments may further include where the CRS may not be present at the resource allocated for TM9 PDSCH, and the MPDCCH:
   TM9 PDSCH and MPCCH may reuse the legacy DMRS pattern for channel estimation;
   All the REs may be utilized for TM9 PDSCH and MPDCCH transmission. An example is illustrated in the FIG. 1, where the gray grids are all PDSCH Resource Elements (REs), no REs for CRS, and no orthogonal frequency division multiplex (OFDM)s is necessary to be reserved for PDCCH.
   The CRS may be transmitted in the TM1/2/6 PDSCH, PBCH subframes.
3) Embodiments may further include where the CRS may be utilized as the reference signal for PDSCH and MPCCH:
   TM9 may not be supported;
   Only one and two antennas ports are supported in the system;
   The MPDCCH may utilize the CRS pattern as the DMRS pattern, where port 107, 108 may be associated with CRS port 0 and port1.
4) Embodiments may further include where the time is reserved for downlink to uplink switching:
   The OFDM symbol of the downlink subframe at the downlink-uplink switch point may be punctured. This DL subframe is the DwPTS, the exactly remaining OFDM symbols may be configured by eNB through high layer signaling. The OFDM symbols at that special downlink subframe may be {3, 6, 9, 10, 11, 12, 14};
   Alternatively, the OFDM symbols for special downlink subframe is fixed to 2 OFDM symbols.
   For UE decoding, it may be rate-matched, or punctured.
5) Embodiments may further include where the essential SIB transmission may be:
   6 RBs, followed the PBCH;
   2~3 time domain repetition;
   TBS for essential SI;
     Option1. fixed to 32 or 30;
     Option2. configured by MIB using the reserved state of SIB1-BR, e.g. 19 for 24, 20 for 32, 21 for 40.
6) Embodiments may further include where the remaining SIB1 transmission reuse the 5-bits schedulingInfo-SIB1-BR in MIB.
   TBS;
   4/8/16 time repetition.

In one embodiment according to this disclosure, the remaining SIB1 may be transmitted on the contiguous valid downlink SFs, since according to the current agreement, the downlink transmission is completed within one COT.

In one embodiment according to this disclosure, the SIB1-BR transmission period may be configured:
   The period may be configured by the reserved states of schedulingInfoSIB1-BR.
   The period time may be 80 ms, 160 ms 320 ms, 640 ms, 1280 ms, 2560 ms, 5120 ms.
   The starting subframe may be based on absolute subframe index. If the starting time of n*80 ms, where n>=0 is the starting time of anchor channel, the starting time of remaining SIB1-BR may be n*80 ms+$T_{dwell,anchor}$, where $T_{dwell,anchor}$ is the dwell time of anchor channel, e.g. 5 ms. For instance, the starting time of remaining SIB1-BR is 85 ms, 165 ms.
   The starting subframe may be based on the floating subframe index, that is n*80 ms+$T_{dwell,anchor}$+n1, where n1 depends on the subframe for (e)CCA, and presence signal transmission.

Figure 10:
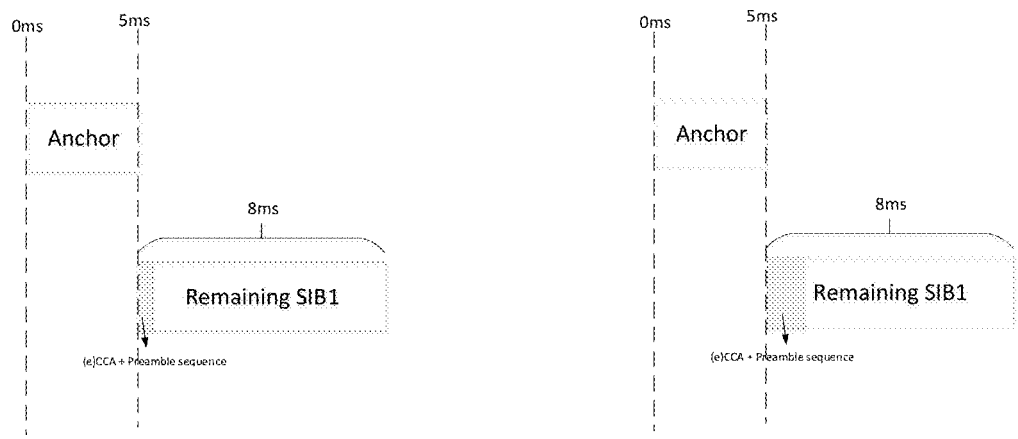
FIG. 10 illustrates two examples of remaining SIB1-BR transmission based on absolute subframe and floating subframe.
Figure 10:
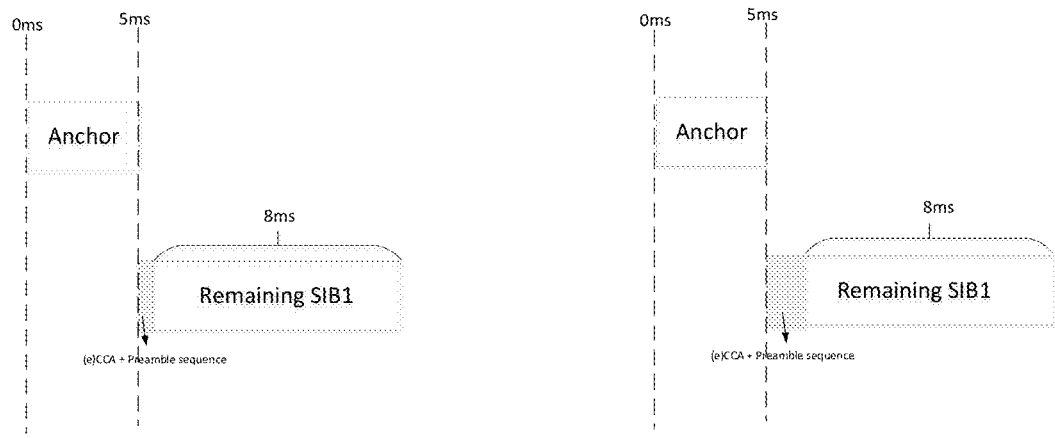

FIG. 10 illustrates two examples of remaining SIB1-BR transmission based on absolute subframe and floating subframe.

In one embodiment according to this disclosure, the transmission of other SIBx, precluding the essential SIB, and remaining SIB1-BR, may be configured in the remaining SIB1-BR:
   MCS; QPSK; TBS;
   Subframe offset;
   Number of repetitions within SI window;
   Time interval between repetitions; and
   The SI window reusing the legacy.

Coverage Enhancement (CE) for MulteFire

The IoT is envisioned as a significantly important technology component that has great potential and that may change our daily life entirely by enabling connectivity between and among a huge of devices. The IoT has wide applications in various scenarios, including smart cities, smart environment, smart agriculture, and smart health systems.

3GPP has standardized two designs to support IoT services—enhanced Machine Type Communication (eMTC) and NarrowBand IoT (NB-IoT). As eMTC and NB-IoT UEs will be deployed in huge numbers, lowering the cost of these UEs is a key enabler for implementation of IoT. Also, low power consumption is desirable to extend the life time of the battery. In addition, the number of cases in which devices are deployed deep inside buildings that require coverage enhancement (CE) in comparison to the defined LTE cell coverage footprint is substantial. In summary, eMTC and NB-IoT techniques are designed to ensure that the UEs have low cost, low power consumption and enhanced coverage. To extend the benefits of LTE IoT designs into unlicensed spectrum, MulteFire 1.1 is expected to specify the design for Unlicensed-IoT (U-IoT) based on eMTC and/or NB-IoT. The unlicensed frequency band of current interest for NB-IoT or eMTC based U-IoT is the sub-1 GHz band and the ~2.4 GHz band.

Further, in addition to eMTC and NB-IoT that apply to narrowband operations, WCE is also agreed as one of the MulteFire 1.1 work item with operation bandwidth of 10 MHz and 20 MHz. The objective of WCE is to extend the MulteFire 1.0 coverage to meet industry IoT market requirements, with the targeted operating bands at 3.5 GHz and 5 GHz.

UE Specific Search Space Design

For the coverage enhancement UE, the performance of ePDCCH is to be enhanced, so as to serve the UEs in the edge of coverage or UEs with poor link quality. On the other hand, for the WCE users, the blind detection cannot be increased to maintain the UE's complexity.

In order to support UESS in ePDCCH for WCE UEs, the following design is proposed:
   UESS ePDCCH configuration;

Candidate search spaces;
16 RBs for UESS ePDCCH;
32 RBs for UESS ePDCCH;
Search space reduction; and
DCI format.

An ePDCCH Information Element (IE) is illustrated in the following figure, where the following parameters are configured for legacy USS. However, not all of them are necessary for CSS ePDCCH to reduce the signaling overhead.

```
EPDCCH-Config-r11 ::=        SEQUENCE{
    config-r11      CHOICE {
        release                         NULL,
        setup                           SEQUENCE {
        subframePatternConfig-r11 CHOICE {
            release                     NULL,
            setup                       SEQUENCE {
                subframePattern-r11         MeasSubframePattern-r10
            }
        }                                                               OPTIONAL, --
Need ON
        startSymbol-r11         INTEGER (1..4)                          OPTIONAL, --
Need OP
        setConfigToReleaseList-r11 EPDCCH-SetConfigToReleaseList-r11    OPTIONAL, -- Need ON
        setConfigToAddModList-r11    EPDCCH-SetConfigToAddModList-r11   OPTIONAL -- Need
ON
        }
    }
}
EPDCCH-SetConfigToAddModList-r11 ::=   SEQUENCE (SIZE(1..maxEPDCCH-Set-r11)) OF EPDCCH-
SetConfig-r11
EPDCCH-SetConfigToReleaseList-r11 ::=SEQUENCE (SIZE(1..maxEPDCCH-Set-r11)) OF EPDCCH-
SetConfigId-r11
EPDCCH-SetConfig-r11 ::=    SEQUENCE {
    setConfigId-r11             EPDCCH-SetConfigId-r11,
    transmissionType-r11        ENUMERATED {localised, distributed},
    resourceBlockAssignment-r11 SEQUENCE{
        numberPRB-Pairs-r11         ENUMERATED {n2, n4, n8},
        resourceBlockAssignment-r11 BIT STRING (SIZE(4..38))
    },
    dmrs-ScramblingSequenceInt-r11     INTEGER (0..503),
    pucch-ResourceStartOffset-r11 INTEGER (0..2047),
    re-MappingQCL-ConfigId-r11      PDSCH-RE-MappingQCL-ConfigId-r11 OPTIONAL, -- Need OR
    ...,
    [[ csi-RS-ConfigZPId2-r12            CHOICE {
        release                     NULL,
        setup                       CSI-RS-ConfigZPId-r11
    }                                                               OPTIONAL -- Need ON
    ]],
    [[ numberPRB-Pairs-v1310             CHOICE {
        release                     NULL,
        setup                       ENUMERATED {n6}
    }                                                               OPTIONAL, -- Need ON
    mpdcch-config-r13       CHOICE {
        release                     NULL,
        setup                       SEQUENCE {
            csi-NumRepetitionCE-r13             ENUMERATED {sf1, sf2, sf4, sf8, sf16, sf32},
            mpdcch-pdsch-HoppingConfig-r13      ENUMERATED {on,off},
            mpdcch-StartSF-UESS-r13             CHOICE {
                fdd-r13                             ENUMERATED {v1, v1dot5, v2, v2dot5, v4,
                                                        v5, v8, v10},
                tdd-r13                             ENUMERATED {v1, v2, v4,
v5, v8, v10,
                                                        v20, spare1}
            },
            mpdcch-NumRepetition-r13        ENUMERATED {r1, r2, r4, r8, r16,
                                                    r32, r64, r128, r256},
            mpdcch-Narrowband-r13       INTEGER (1.. maxAvailNarrowBands-r13)
        }
    }                                                           OPTIONAL -- Need ON
    ]]
}
EPDCCH-SetConfigId-r11 ::= INTEGER (0..1)
```

In one embodiment according to this disclosure, for the parameters subframePattern:

It is not defined, where each subframe is the valid subframe for ePDCCH reception to search UESS for WCE.

It may be configured by an evolved Node-B (eNB) as the legacy bit field.

In one embodiment according to this disclosure, for the parameter startSymbol:

It may be indicated by CFI or pdsch-Start-r 10 as the legacy bit field,

It may be configured by eNB through SIB1 or MIB or RRC message.

This field startSymbol will be applicable to CSS ePDCCH and the associated PDSCH, and/or the USS ePDCCH and the associated PDSCH.

In one embodiment according to this disclosure, the parameter pucch-ResourceStartOffset is not necessary, since the ACK/NACK is to be fed back for data configured by DCI in UESS.

In one embodiment according to this disclosure, the parameter re-MappingQCL-ConfigId-r11 may not be necessary or may be optional, since TM10 is not supported in an unlicensed system.

In one embodiment according to this disclosure, for the parameter setConfigToReleaseList-r11 and setConfigToAddModList-r11:

They may be pre-defined, e.g. two sets are configured;
They may be configured by eNB through SIB1 or MIB or RRC message.

In one embodiment according to this disclosure, the EPDCCH-SetConfigId-r11 may take a value from 0, 1, 2, or 3, while two sets may be associated together, e.g. set 0 is associated with set 1, and set 2 is associated with set 3.

In one embodiment according to this disclosure, for EPDCCH-SetConfig-r11:

setConfigId is pre-defined, the set configuration is implicitly associated with the configuration sequence, that is {set 0} follows {set 1}, {set 2}, {set 3};
transmissionType may be configured as the legacy system, or may be confined to one set, that is either localized or distributed;
numberPRB-Pairs is pre-defined, e.g. 8 RBs for each set. Alternatively, it may be configured by eNB through SIB1 or MIB or RRC message;
resourceBlockAssignment, it may be defined as the legacy resource allocation, resourceBlockAssignment-r11, BIT STRING (SIZE(4 . . . 38)). Alternatively, it may be pre-defined in the unit of N contiguous distributed/localized VRBs, e.g. N may be 8, or 4. Alternatively, resourceBlockAssignment is hard coded, or pre-defined, be blindly detected together with the candidates.

In one embodiment according to this disclosure, the dmrs-ScramblingSequenceInt, may be configured by eNB through RRC as the legacy system.

In one embodiment according to this disclosure, the parameter csi-RS-ConfigZPId2 is optional or not necessary and may be configured by eNB through RRC signaling as the legacy system.

In one embodiment according to this disclosure, the pdcch-candidateReductions may be configured for CSS.

Candidate Search Spaces

The legacy PDCCH is illustrated in Table 7, where 16 blind detections for UESS are shown.

TABLE 7

PDCCH candidates monitored by a UE

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |

For ePDCCH, the aggregation level is attached as shown in Table 8 and Table 9.

TABLE 8

EPDCCH candidates monitored by a UE
(Two Distributed EPDCCH-PRB-sets - Case 3)

| $N_{RB}^{Xp1}$ | $N_{RB}^{Xp2}$ | Number of EPDCCH candidates $[M_{p1}^{(L)}, M_{p2}^{(L)}]$ for Case 3 | | | | |
|---|---|---|---|---|---|---|
| | | L = 1 | L = 2 | L = 4 | L = 8 | L = 16 |
| 8 | 8 | 2, 2 | 2, 2 | 2, 2 | 1, 1 | 1, 1 |
| 8 | 4 | 2, 2 | 2, 2 | 2, 2 | 1, 1 | 1, 1 |

TABLE 9

EPDCCH candidates monitored by a UE
(Two Localized EPDCCH-PRB-sets—Case 3)

| $N_{RB}^{Xp1}$ | $N_{RB}^{Xp2}$ | Number of EPDCCH candidates $[M_{p1}^{(L)}, M_{p2}^{(L)}]$ for Case 3 | | | |
|---|---|---|---|---|---|
| | | L = 1 | L = 2 | L = 4 | L = 8 |
| 8 | 8 | 3, 3 | 3, 3 | 1, 1 | 1, 1 |
| 8 | 4 | 3, 3 | 3, 3 | 1, 1 | 1, 1 |

In one embodiment according to this disclosure, the number of candidates in UESS ePDCCH may be the same or smaller than the legacy CSS PDCCH.

For AL=64, candidates are generated based on AL=32 within one set, and repeated in another set;

For AL<64, candidates may be generated based on AL/2 within one set, and repeated in another set.

Alternatively, candidates may be generated based on AL within one set.

The UESS may be defined based on either localized or distributed RE mapping.

In one embodiment according to this disclosure, the maximum AL for localized ePDCCH may be enhanced to AL=32.

16 RBs for UESS ePDCCH

In one embodiment according to this disclosure, the two ePDCCH sets, 8+8 RBs for UESS ePDCCH are configured by eNB, mostly using the legacy ePDCCH configuration, as shown in Table 10 and Table 11.

Maximum AL is 64 for UE. One candidate for AL=64, two candidates for AL=32, two/four candidates for AL=16. It may be applicable for distributed ePDCCH.

Alternatively, maximum AL is 32 for UE. Two candidates for AL=32, two/four candidates for AL=16, two/four candidates for AL=8. It may be applicable for distributed ePDCCH.

The remaining candidates are equally divided for smaller AL, e.g. 8/4/2/1.

The aggregation level may be 4 levels or 5 levels. Alternatively, all the aggregation levels may be configured.

In one embodiment according to this disclosure, the candidate search space reuses the legacy 8+8 case 1, two distributed ePDCCH sets, while one candidate search space AL=64 is added, and one candidate with a smaller AL may be decreased by one, e.g. AL=2, as illustrated in Option 1 in Table 10.

In one embodiment according to this disclosure, the candidate search space can focus on the larger AL with 6 level ALs, ranging from AL=2 to AL=64, as in Option 2.

In one embodiment according to this disclosure, the candidate search space mainly focuses on the larger AL, as in Option 3, with 4 level ALs.

In one embodiment according to this disclosure, the candidate search space mainly focuses on the larger AL, as in Option 4, with 5 level ALs.

In one embodiment according to this disclosure, the candidate search space mainly focuses on the larger AL, as in Option 5, with 6 level ALs.

TABLE 10

Example 1 of candidate search space with maximum AL = 64

| Aggregation level | | L = 1 | L = 2 | L = 4 | L = 8 | L = 16 | L = 32 | L = 64 |
|---|---|---|---|---|---|---|---|---|
| Option 1 | $[M_{p1}^{(L)}, M_{p2}^{(L)}]$ | 0, 0 | 3, 2 | 2, 2 | 1, 1 | 1, 1 | 1, 1 | 1 |
| Option 2 | $[M_{p1}^{(L)}, M_{p2}^{(L)}]$ | 2, 2 | 2, 1 | 1, 1 | 1, 1 | 1, 1 | 1, 1 | 1 |
| Option 3 | $[M_{p1}^{(L)}, M_{p2}^{(L)}]$ | | | | 4, 4 | 2, 2 | 1, 1 | 1 |
| Option 4 | $[M_{p1}^{(L)}, M_{p2}^{(L)}]$ | | | 3, 2 | 2, 2 | 2, 2 | 1, 1 | 1 |
| Option 5 | $[M_{p1}^{(L)}, M_{p2}^{(L)}]$ | | 1, 1 | 1, 1 | 2, 2 | 2, 2 | 1, 1 | 1 |

TABLE 11

Example 2 of candidate search space with maximum AL = 32

| Aggregation level | | L = 1 | L = 2 | L = 4 | L = 8 | L = 16 | L = 32 |
|---|---|---|---|---|---|---|---|
| Option 1 | $[M_{p1}^{(L)}, M_{p2}^{(L)}]$ | | | 3, 3 | 3, 3 | 1, 1 | 1, 1 |
| Option 2 | $[M_{p1}^{(L)}, M_{p2}^{(L)}]$ | 2, 2 | 2, 2 | 1, 1 | 1, 1 | 1, 1 | 1, 1 |
| Option 3 | $[M_{p1}^{(L)}, M_{p2}^{(L)}]$ | | | 3, 3 | 2, 2 | 2, 2 | 1, 1 |

32 RBs for UESS ePDCCH

In one embodiment according to this disclosure, the four ePDCCH sets, 8+8+8+8 RBs for UESS ePDCCH are configured by eNB, mostly using the legacy ePDCCH configuration, as shown in Table 12 and Table 13.

Two candidates for AL=64;
Four candidates for AL=32;
Four candidates for AL=16;
The remaining candidates are equally divided for smaller ALs, e.g. 8/4/2/1;
The aggregation level may be 4 or 5. Alternatively, all the aggregation levels may be configured.
For AL=64, two sets are associated by default. Within these two sets, the ePDCCH is generated based on AL=32, and repeated for the other set. One candidate may be based on set0 and set 1, and the other candidate may be based on set 2 and set 3.

The aggregation level may be 4 or 5. Alternatively, all the aggregation levels may be configured.

The eCCE is numbered within one sets, and the FeCCE is obtained by concatenating across multiple eCCEs.

TABLE 13 example 3 of candidate search space

| Aggregation level | | L = 2 | L = 4 | L = 8 | L = 16 | L = 32 | L = 64 |
|---|---|---|---|---|---|---|---|
| Option 1 | $[M_{p1}^{(L)} M_{p2}^{(L)}]$ | (1, 0) | (1, 0) | (2, 2) | (2, 2) | (2, 2) | (1, 1) |
| Option 2 | $[M_{p1}^{(L)} M_{p2}^{(L)}]$ | (2, 0) | (2, 0) | (2, 0) | (2, 2) | (2, 2) | (1, 1) |

Search Space Reduction

In the legacy system, for a UE specific search space at aggregation level L for a serving cell, the parameter pdcch-candidateReductions, as well as pdcch-candidateReductions-Format0A, pdcch-candidateReductions-Format0B-4A-4B-AL1-2, pdcch-candidateReductions-Format0B-4A-4B-AL3-4 has been defined.

In one embodiment according to this disclosure, the legacy PDCCH pdcch-candidateReductions may be reused. Alternatively, a pdcch-candidateReductionAL6 may be introduced. However, if only one candidate is defined for AL=64, there is no requirement for pdcch-candidateReductionAL6.

DCI Format

In the current MF1.0 system, the DCI formats 1/1A/1B/1D/2/2A/2B/2C/2D for UESS are available:

Format 1 is for SIMO PDSCH scheduling with non-contiguous RA;

TABLE 12

Example 1 of candidate search space with maximum AL 64 within 32RBs

| Aggregation level | | L = 2 | L = 4 | L = 8 | L = 16 | L = 32 | L = 64 |
|---|---|---|---|---|---|---|---|
| Option 1 | $[M_{p1}^{(L)} M_{p2}^{(L)} M_{p3}^{(L)} M_{p4}^{(L)}]$ | (1, 0, 0, 0) | (1, 0, 0, 0) | (1, 1, 1, 1) | (1, 1, 1, 1) | (1, 1, 1, 1) | 2 |
| Option 2 | $[M_{p1}^{(L)} M_{p2}^{(L)} M_{p3}^{(L)} M_{p4}^{(L)}]$ | | (2, 0, 0, 0) or (1, 1, 0, 0) | (1, 1, 1, 1) | (1, 1, 1, 1) | (1, 1, 1, 1) | 2 |
| Option 3 | $[M_{p1}^{(L)} M_{p2}^{(L)} M_{p3}^{(L)} M_{p4}^{(L)}]$ | | | (1, 1, 1, 1) or (2, 2, 1, 1) | (1, 1, 1, 1) | (1, 1, 1, 1) | 2 |
| Option 4 | $[M_{p1}^{(L)} M_{p2}^{(L)} M_{p3}^{(L)} M_{p4}^{(L)}]$ | | | (1, 1, 1, 1) | (1, 1, 1, 1) | (2, 2, 1, 1) | 2 |

In one embodiment according to this disclosure, two ePDCCH sets, 16+16 RBs for UESS ePDCCH are configured by eNB:

Two candidates for AL=64;
Four candidates for AL=32;
Four candidates for AL=16;
The remaining candidates are equally divided for smaller ALs, e.g. 8/4/2/1;

Format 1A is for SIMO PDSCH scheduling with contiguous RA;

Format 1B is for close-loop single rank transmission with contiguous resource allocation;

Format 1D is for compact scheduling of one PDSCH codeword with precoding and power offset information;

Format 2 is for close-loop MIMO PDSCH scheduling, with non-contiguous RA, PMI bit fields 3/6 for 2/4 antennas;

Format 2A is for large-delay CDD MIMO PDSCH scheduling, with non-contiguous RA, PMI bit fields 0/2 for 2/4 antennas;

Format 2B is for dual layer PDSCH scheduling, with non-contiguous RA;

Format 2C is for up to 8 layers spatial multiplexing MIMO PDSCH scheduling, with non-contiguous RA with 3 or 4 bits for layer and DMRS configuration; and Format 2D is for TM10 COMP PDSCH scheduling with non-contiguous RA.

In one embodiment according to this disclosure, the legacy DCI may be supported for WCE UE scheduling.

Comparison of DCI format 2x and 1x shows that the capacity is increased by 10~20 bits, which will lead to better link quality enhancement. In one embodiment according to this disclosure, only format 1x will be utilized for WCE UE scheduling.

Format 1 for SIMO PDSCH scheduling with non-contiguous RA may be supported for WCE scheduling;

Format 1A for SIMO PDSCH scheduling with contiguous RA, may be supported for WCE scheduling;

Format 1B is for close-loop single rank transmission with contiguous resource allocation for WCE scheduling;

Format 1D is for compact scheduling of one PDSCH codeword with precoding and power offset information. It is for MU-MIMO scheduling, and may not be necessary for WCE scheduling.

Common Search Space Design

Since the enhanced physical downlink control channel (ePDCCH) will be utilized for broadcasting the DCI transmission, the search space, format, as well as the ePDCCH parameter configuration for common search space are designed. Embodiments provide designs for Common Search Space (CSS) on ePDCCH for WCE UEs, including one or more of the following:

CSS ePDCCH configuration;

Candidate search spaces;

16 resource blocks (RBs) for CSS ePDCCH, including DCI format 1A only, DCI format 1A+DCI format 1C;

Physical resource block (PRB) allocation for CSS ePDCCH in the candidate search;

32 RBs for CSS ePDCCH, including DCI format 1A only, DCI format 1A+DCI format 1C;

Further enhanced control channel element (further eCCE or FeCCE);

Remaining detail;

System Information Block (SIB) Period and Paging period.

CSS ePDCCH Configuration

An ePDCCH information element (IE) is illustrated in the following figure, where the following parameters are configured for a legacy user-specific search space (USS). However, not all of them are necessary for CSS ePDCCH to reduce the signaling overhead.

```
EPDCCH-Config-r11 ::=           SEQUENCE{
    config-r11       CHOICE {
        release                         NULL,
        setup                           SEQUENCE {
            subframePatternConfig-r11       CHOICE {
                release                         NULL,
                setup                           SEQUENCE {
                    subframePattern-r11             MeasSubframePattern-r10
                }
            }                                                               OPTIONAL, -- Need ON
            startSymbol-r11                 INTEGER (1..4)                  OPTIONAL, -- Need OP
            setConfigToReleaseList-r11 EPDCCH-SetConfigToReleaseList-r11   OPTIONAL, -- Need ON
            setConfigToAddModList-r11   EPDCCH-SetConfigToAddModList-r11   OPTIONAL -- Need ON
        }
    }
}
EPDCCH-SetConfigToAddModList-r11 ::=    SEQUENCE (SIZE(1..maxEPDCCH-Set-r11)) OF EPDCCH-SetConfig-r11
EPDCCH-SetConfigToReleaseList-r11 ::= SEQUENCE (SIZE(1..maxEPDCCH-Set-r11)) OF EPDCCH-SetConfigId-r11
EPDCCH-SetConfig-r11 ::=    SEQUENCE {
    setConfigId-r11             EPDCCH-SetConfigId-r11,
    transmissionType-r11        ENUMERATED {localised, distributed},
    resourceBlockAssignment-r11     SEQUENCE{
        numberPRB-Pairs-r11         ENUMERATED {n2, n4, n8},
        resourceBlockAssignment-r11 BIT STRING (SIZE(4..38))
    },
    dmrs-ScramblingSequenceInt-r11  INTEGER (0..503),
    pucch-ResourceStartOffset-r11 INTEGER (0..2047),
    re-MappingQCL-ConfigId-r11      PDSCH-RE-MappingQCL-ConfigId-r11 OPTIONAL, -- Need OR
    ...,
    [[ csi-RS-ConfigZPId2-r12           CHOICE {
        release                         NULL,
        setup                           CSI-RS-ConfigZPId-r11
    }                                                                       OPTIONAL -- Need ON
    ]],
    [[ numberPRB-Pairs-v1310            CHOICE {
        release                         NULL,
        setup                           ENUMERATED {n6}
    }                                                                       OPTIONAL, -- Need ON
    mpdcch-config-r13               CHOICE {
```

```
             release                      NULL,
             setup                        SEQUENCE {
                 csi-NumRepetitionCE-r13       ENUMERATED {sf1, sf2, sf4, sf8, sf16, sf32},
                 mpdcch-pdsch-HoppingConfig-r13   ENUMERATED {on,off},
                 mpdcch-StartSF-UESS-r13        CHOICE {
                     fdd-r13                       ENUMERATED {v1, v1dot5, v2, v2dot5, v4,
                                                                v5, v8, v10},
                                  tdd-r13                       ENUMERATED {v1, v2, v4,
v5, v8, v10,
                                                     v20, spare1}
             },
                 mpdcch-NumRepetition-r13    ENUMERATED {r1, r2, r4, r8, r16,
                                                          r32, r64, r128, r256},
                 mpdcch-Narrowband-r13       INTEGER (1.. maxAvailNarrowBands-r13)
             }
        }
    ]]                                                   OPTIONAL -- Need ON
}
EPDCCH-SetConfigId-r11 ::= INTEGER (0..1)
```

The common search space includes system information (SI)-radio network temporary identifier (RNTI), paging indicator (PI)-RNTI, random access (RA)-RNTI, transmit power control (TPC)-physical uplink control channel (PUCCH)-RNTI, and TPC-physical uplink shared channel (PUSCH)-RNTI in the common search space.

In embodiments, the parameter subframePattern may be configured by eNB as the legacy bit field and it is not necessary to be defined it where each subframe is a valid subframe for ePDCCH reception to search CSS. Additionally, different DCIs for different broadcasting information are searched in different timing instants. For example, DCI with SI-RNTI may be searched during the SI window; DCI with PI-RNTI may be searched during the paging occasion; and DCI with RA-RNTI may be searched during the random access response (RAR) window occasion, In embodiments, the parameter startSymbol may be indicated by CFI or pdsch-Start-r10 as the legacy bit field, and may be configured by evolved nodeB (eNB) through system information block type 1 (SIB1) or master information block (MIB). The startSymbol field may be applicable to CSS ePDCCH and the associated physical downlink shared channel (PDSCH), and/or the USS ePDCCH and the associated PDSCH.

In embodiments, the parameter setConfigToReleaseList-r11 and setConfigToAddModList-r11 may be pre-defined, e.g., two sets are configured; they may be configured by eNB through SIB1 or MIB.

In embodiments, for EPDCCH-SetConfig-r11:
 the setConfigId, may be pre-defined, where the set configuration is implicitly associated with the configuration sequence, that is {set 0} follows {set 1};
 the transmission Type may be pre-defined as the distributed case since only distributed can support the AL=32, or it may be configured by eNB through SIB1 or MIB;
 the numberPRB-Pairs is pre-defined, e.g., 8 RBs for each set, or it may be configured by eNB through SIB1 or MIB;
 the resourceBlockAssignment may be defined as the legacy resource allocation, resourceBlockAssignment-r11, BIT STRING (SIZE(4 . . . 38)), or it may be pre-defined in the unit of N contiguous distributed/localized VRBs, e.g., N may be 8, or 4. One flag may be configured to indicate UE that whether the resource configuration is based on contiguous PRB or VRB. Alternatively, resourceBlockAssignment may be hard coded, or pre-defined, be blindly detected together with the candidates.

In embodiments, the dmrs-ScramblingSequenceInt, may be configured by eNB through SIB1/MIB, or pre-defined, e.g., the cell ID.

In embodiments, the pucch-ResourceStartOffset is not necessary, since no ACK/NACK is necessary to be fed back for data configured by DCI in CSS.

In embodiments, the parameter re-MappingQCL-ConfigId-r11 is not necessary or may be optional since transmission mode 10 (TM10) cannot be supported in unlicensed system.

In embodiments, the parameter csi-RS-ConfigZPId2 is optional or not necessary; inclusion of this parameter may depend on eNB implementation for puncturing ePDCCH or not, and UE will detect it without puncture information.

In embodiments, the repetition times of the associated PDSCH may be configured by eNB through higher layer signaling:
 Different repetition times may be configured for different entities, e.g., one repetition may be configured in one schedulingInforList; repetition for paging, RA, SI may be different.

In embodiments, the pdcch-candidateReductions is not configured for CSS.

Candidate Search Spaces

The candidate search space for legacy PDCCH is illustrated by Table 14, where 12 blind detection for CSS, 6 for DCI format 1A, and 6 for DCI format 1C.

TABLE 14

| PDCCH candidates monitored by a UE | | | |
|---|---|---|---|
| Search space $S_k^{(L)}$ | | | Number of |
| Type | Aggregation level L | Size [in CCEs] | PDCCH candidates $M^{(L)}$ |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

In embodiments, the number of candidates included in the CSS ePDCCH may be the same or smaller than the legacy CSS PDCCH.

16 RBs for CSS ePDCCH

In embodiments, a maximum of 16 RBs may be configured for CSS ePDCCH.

Format 1A only

In embodiments, the ePDCCH resource configuration may have already been configured by the eNB through high layer signaling (e.g., RRC signaling/messages, and the like), where the candidates may be:

Aggregation level (AL)=64, one candidates, format 1A;
AL=32, two candidates, format 1A.

In embodiments, the ePDCCH resource may be jointly encoded for blind detection, where the ePDCCH resource for gap 1 and gap 2 may be allocated at separate physical resource(s), which may include a total of 9 candidates as follows:

AL=64, one candidate, format 1A, localized VRB;
AL=64, one candidate, format 1A, distributed VRB, $N_{gap,1}$;
AL=64, one candidate, format 1A, distributed VRB, $N_{gap,2}$;
AL=32, two candidates, format 1A, localized VRB;
AL=32, two candidates, format 1A, distributed VRB, $N_{gap,1}$;
AL=32, two candidates, format 1A, distributed VRB, $N_{gap,2}$.

In embodiments, the ePDCCH resource may be jointly encoded for blind detection, where the ePDCCH resource for gap 1 and gap 2 are allocated at the same physical resource, which may include a total of 6 candidates:

AL=64, one candidate, format 1A, localized VRB;
AL=64, one candidate, format 1A, distributed VRB, $N_{gap,1}/N_{gap,1}$;
AL=32, two candidates, format 1A, localized VRB;
AL=32, two candidates, format 1A, distributed VRB, $N_{gap,1}/N_{gap,2}$.

PRB Allocation for CSS ePDCCH in the Candidate Search

In embodiments, as shown in Table 15 and Table 16, the ePDCCH resource for localized VRB may be:

Pre-defined contiguous PRBs at one edge, e.g., 16PRBs from 0 to 15;
Pre-defined contiguous PRBs at two edges, e.g., 8 PRBs from 0 to 7, and 8 RBs from 92 to 99;
The PRBs for CSS ePDCCH is configured by eNBs.

In embodiments, the ePDCCH resource for distributed VRB when $N_{gap,1}$ and $N_{gap,2}$ may share the same resource, Pre-defined PRBs, that is PRB 0~2, PRB 24~26, PRB69~71, PRB 93~95, PRB 96~99;
The PRBs for CSS ePDCCH is configured by eNBs;
If gap1/gap2 share the same PRBs for ePDCCH that is, VRB 12~83, 72RBs.

TABLE 15

$N_{gap,1}$ and $N_{gap,2}$ share the same physical RBs for CSS ePDCCH

| PRBIndex | $N_{gap,2}$ | | $N_{gap,1}$ | |
|---|---|---|---|---|
| | VRBIndex at the first slot | VRBIndex at the second slot | VRBIndex at the first slot | VRBIndex at the second slot |
| 0 | 0 | 2 | 0 | 2 |
| 1 | 4 | 6 | 4 | 6 |
| 2 | 8 | 10 | 8 | 10 |
| 24 | 3 | 1 | 1 | 3 |
| 25 | 7 | 5 | 5 | 7 |
| 26 | 11 | 9 | 9 | 11 |
| 69 | 84 | 86 | 86 | 84 |
| 70 | 88 | 90 | 90 | 88 |
| 71 | 92 | 94 | 94 | 92 |
| 93 | 87 | 85 | 87 | 85 |
| 94 | 91 | 89 | 91 | 89 |

TABLE 15-continued $N_{gap,1}$ and $N_{gap,2}$ share the same physical RBs for CSS ePDCCH

| PRBIndex | $N_{gap,2}$ | | $N_{gap,1}$ | |
|---|---|---|---|---|
| | VRBIndex at the first slot | VRBIndex at the second slot | VRBIndex at the first slot | VRBIndex at the second slot |
| 95 | 95 | 93 | 95 | 93 |

In embodiments, for the ePDCCH resource for distributed VRB when $N_{gap,1}$ and $N_{gap,2}$ share the different resource blocks:

Pre-defined PRBs for $N_{gap,1}$, that is PRB 0~2, PRB 24~26, PRB48~50, PRB 72~74, PRB 96~99; which corresponding to VRB 0~11. Alternatively, the PRB corresponds to VRB 84~95 may be configured. Here, 84VRBs may be configured.
Pre-defined PRBs for $N_{gap,2}$, that is PRB 0~2, PRB8~, PRB 16~18, PRB 24~26, PRB 96~99, which corresponding to VRB 0~11. Alternatively, the PRB corresponds to VRB 84~95 may be configured. Here, 84VRBs may be configured.

TABLE 16 another example of distributed VRB configuration

| PRBIndex | $N_{gap,1}$ | |
|---|---|---|
| | VRBIndex at the first slot | VRBIndex at the first slot |
| 0 | 0 | 0 |
| 1 | 4 | 4 |
| 2 | 8 | 8 |
| 24 | 1 | 1 |
| 25 | 5 | 5 |
| 26 | 9 | 9 |
| 48 | 2 | 2 |
| 49 | 6 | 6 |
| 50 | 10 | 10 |
| 72 | 3 | 3 |
| 73 | 7 | 7 |
| 74 | 11 | 11 |
| 96 | | |
| 97 | | |
| 98 | | |
| 99 | | |

Format 1A+Format 1C

In embodiments, where the ePDCCH resource configuration has already been configured by eNB through high layer signaling, the candidates may be as follows, which may include a total of 7 or 9 candidates.

AL=64, one candidates, format 1A;
AL=32, two candidates, format 1A;
AL=32, two candidates, format 1C;
AL=16, two or four candidates, format 1C.

In embodiments, where the ePDCCH resource configuration has already been configured by eNB through high layer signaling, the candidates may be transparent to DCI format, wherein:

AL=64, one candidate;
AL=32, two candidates;
AL=16, two or three or four candidates.

In embodiments, the ePDCCH resource may be jointly encoded for blind detection, where the ePDCCH resource for gap 1 and gap 2 may be allocated at separate physical resource, one or more candidates may be found among the following candidates:
- AL=64, one candidate, format 1A, localized VRB;
- AL=64, one candidate, format 1A, distributed VRB, $N_{gap,1}$;
- AL=64, one candidate, format 1A, distributed VRB, $N_{gap,2}$;
- AL=32, two candidates, format 1A, localized VRB;
- AL=32, two candidates, format 1A, distributed VRB, $N_{gap,1}$;
- AL=32, two candidates, format 1A, distributed VRB, $N_{gap,2}$;
- AL=32, two candidates, format 1C, distributed VRB, $N_{gap,1}$;
- AL=32, two candidates, format 1C, distributed VRB, $N_{gap,2}$;
- AL=16, four candidates, format 1C, distributed VRB, $N_{gap,1}$;
- AL=16, four candidates, format 1C, distributed VRB, $N_{gap,2}$.

In embodiments, the ePDCCH resource may be jointly encoded for blind detection, where the ePDCCH resource for gap 1 and gap 2 may be allocated at same physical resource, one or more candidates may be found among the following candidates:
- AL=64, one candidate, format 1A, localized VRB;
- AL=64, one candidate, format 1A, distributed VRB;
- AL=32, two candidates, format 1A, localized VRB;
- AL=32, two candidates, format 1A, distributed VRB;
- AL=32, two candidates, format 1C, distributed VRB;
- AL=16, four candidates, format 1C, distributed VRB.

32 RBs for CSS ePDCCH

In embodiments, maximum 32 RBs may be utilized for CSS ePDCCH. The candidate number at 16 RBs may have to be doubled.

In embodiments, the candidate may be DCI format 1A only, wherein:
- AL=64, two candidates;
- AL=32, two or four candidates;
- AL=16, two or four or eight candidates.

In embodiments, the candidate may be DCI format 1A and DCI format 1C, wherein:
- AL=64, two candidates for DCI format 1A;
- AL=32, four candidates for DCI format 1A;
- AL=32, two candidates for DCI format 1C;
- AL=16, four candidates for DCI format 1C.

In embodiments, the candidate may be transparent to DCI format, wherein:
- AL=64, two candidates;
- AL=32, two candidates;
- AL=16, two candidates.

For instance, for DCI format 1A where the ePDCCH resource for gap 1 and gap 2 are allocated at the same physical resource, which may include a total of 6 candidates:
- AL=64, two candidates, format 1A, localized VRB;
- AL=64, two candidates, format 1A, distributed VRB, $N_{gap,1}/N_{gap,1}$;
- AL=32, four candidates, format 1A, localized VRB;
- AL=32, four candidates, format 1A, distributed VRB, $N_{gap,1}/N_{gap,2}$.

Further Enhanced eCCE

In embodiments, the Resource Element (RE) mapping to eCCE reuses the legacy rule as incumbent LTE system, and the mapping is restricted within one set.

In embodiments, for AL<=64, the candidates are confined within one set, for AL=64, the association rule is pre-defined or configured by eNB through high layer signaling. E.g., the set 0 is associated with set 1, set 2 is associated with set 3. When performing AL=64, the ePDCCH on set 0 is repeated in the set 1.

In embodiments, the further enhanced eCCE may be concatenated by eCCEs of two sets in the distributed manner or localized manner.

The eCCE on set 0 may be numbered as #$eCCE_{0,0}$ #$eCCE_{0,1}$ ... #$eCCE_{0,31}$, and the eCCE set 1 may be number as #$eCCE_{1,0}$ #$eCCE_{1,1}$ ... #$eCCE_{1,31}$. The aggregated FeCCE may be #$eCCE_{0,0}$ #$eCCE_{0,1}$ ... #$eCCE_{0,31}$, #$eCCE_{1,0}$ #$eCCE_{1,1}$ ... #$eCCE_{1,31}$, or #$eCCE_{0,0}$ #$eCCE_{1,0}$ #$eCCE_{0,1}$ #$eCCE_{1,1}$ ... #$eCCE_{0,31}$ #$eCCE_{1,31}$.

In embodiments, for 8RBs+8RBs to support AL=64, it may be repeated by 2 AL=32, where the AL=32 reuses the legacy physical layer procedure.

Remaining Detail

Partial subframe. In embodiments, a partial subframe is not allowed for ePDCCH CSS. Since the PDSCH starts at the same subframe as DCI, if repetition is applied, the available resource at two different subframes is not even, making MCS selection difficult.

Cross-carrier scheduling. In embodiments, partial subframe is not allowed for ePDCCH CSS. Since the PDSCH starts at the same subframe as DCI, if repetition is applied, the available resource at two different subframes is not even, making MCS selection difficult.

Content. In embodiments, one or more entries may be supported in CSS ePDCCH:
DCI scrambled by SI-RNTI;
DCI scrambled by PI-RNTI;
DCI scrambled by RA-RNTI;
DCI scrambled by TPC-PUCCH-RNTI;
DCI scrambled by TPC-PUSCH-RNTI.

SIB, Period

For SI transmission, the schedulingInfoList is configured by eNB through SIB1/2.

In embodiments, for WCE, the period and SIB types are configured:
si_periodicity/sib_MappingInfo may be the same as legacy non-WCE;
si_periodicity/sib_MappingInfo may be the separated as legacy non-WCE.

In embodiments, for si_WindowLength may be configured:
si_WindowLength may be the either the same or different as legacy non-WCE.
When timing repetition on PDSCH is applied, si_WindowLength may be utilized to constrain the ePDCCH and the starting PDSCH subframe; alternatively, si_WindowLength may be utilized to constrain the ending PDSCH subframe. In the latter case PDSCH for SI may be not be scheduled later than $N_{end}$-$N_{rep}$+1, where $N_{end}$ is the ending subframe of one window, and $N_{rep}$ the repetition number.

Paging Period

In embodiments, for WCE, the starting subframe is calculated based on the PO and PF, and the repetition may be indicated by DCI or RRC configured.

Figure 11:
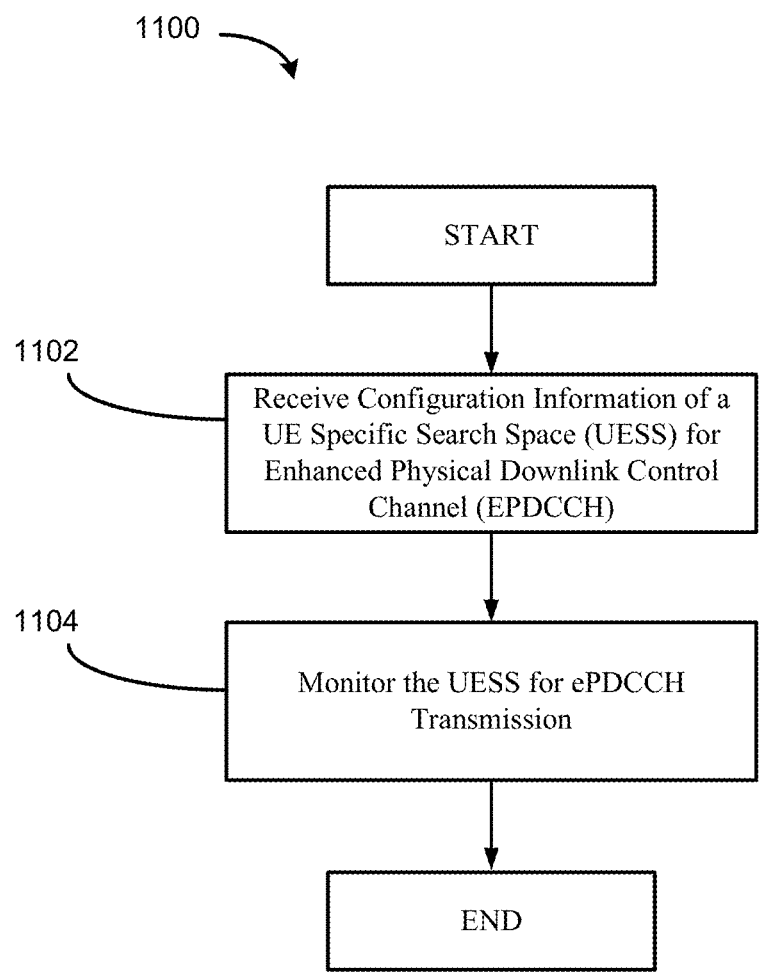
FIG. 11 shows a method described herein to support UESS in ePDCCH for WCE UE in accordance with some embodiments.

FIG. 11 shows a method 1100 described herein to support UESS in ePDCCH for WCE UE in accordance with some embodiments.

As shown in FIG. 11, the method 1100 to support UESS in ePDCCH for WCE UE in accordance with some embodiments comprises: at 1102, receive configuration information of a UE specific Search Space (UESS) for enhanced Physical Downlink Control Channel (ePDCCH); and at 1104, monitor the UESS for ePDCCH transmission.

In some embodiments, the electronic device(s), network(s), system(s), chip(s) or component(s), or portions or implementations thereof, of any figure herein may be configured to perform one or more processes, techniques, or methods as described herein, or portions thereof.

EXAMPLES

Example 1 may include an apparatus of a user equipment (UE) comprising: an interface configured to receive configuration information of a UE specific Search Space (UESS) and a Common Search Space (CSS) for enhanced Physical Downlink Control Channel (ePDCCH) from a radio-frequency (RF) circuitry; and a processor configured to monitor the UESS and the CSS for ePDCCH transmission; wherein the interface and/or the processor is adaptable to support a wideband coverage enhancement (WCE), and the configuration information includes information for configuration of one or more of: candidate search space (SS), Resource Block (RB) for the UESS and the CSS for ePDCCH transmission, search space reduction, or transmission of Downlink Control Information (DCI).

Example 2 may include the subject matter of example 1 or any other examples herein, wherein the UESS and the CSS for ePDCCH transmission are indicated by a parameter startSymbol, which is indicated by Control Format Indicator (CFI) or a pdsch-Start parameter, or is configured by an evolved Node-B (eNB) through one of a System Information Block 1 (SIB1), Master Information Block (MIB) or Radio Resource Control (RRC) message, wherein the parameter startSymbol is applicable to the CSS ePDCCH and associated Physical Downlink Control Channel (PDSCH) and/or the USS ePDCCH and associated PDSCH.

Example 3 may include the subject matter of example 1 or any other examples herein, wherein the UESS and the CSS for ePDCCH transmission are indicated by a parameter setConfigToReleaseList and a parameter setConfigToAddModList, wherein the two parameters are pre-defined if two ePDCCH sets are configured for the UESS and the CSS for ePDCCH, or the two parameters are configured by an evolved Node-B (eNB) through one of SIB1, MIB or RRC message.

Example 4 may include the subject matter of example 1 or any other examples herein, wherein the UESS and the CSS for ePDCCH transmission are indicated by a parameter EPDCCH-SetConfigId, which take a value from 0, 1, 2, or 3, while two ePDCCH sets configured for the UESS and the CSS for ePDCCH are associated together.

Example 5 may include the subject matter of example 1 or any other examples herein, wherein the parameter EPDCCH-SetConfigId includes: setConfigId, which is pre-defined, and wherein the set configuration is implicitly associated with the configuration sequence; transmission-Type, which is configured as the legacy system, or is confined to one set; numberPRBPairs, which is pre-defined for each set, or alternatively is configured by an evolved Node-B (eNB) through SIB1 or MIB or RRC message; resourceBlockAssignment, which is defined as the legacy resource allocation, or alternatively is pre-defined in the unit of N contiguous distributed/localized Virtual Resource Blocks (VRBs), wherein N is 4 or 8; or alternatively, resourceBlockAssignment is hard coded, or pre-defined, and is blindly detected together with the candidate search spaces.

Example 6 may include the subject matter of example 1 or any other examples herein, wherein the UESS and the CSS for ePDCCH comprise two ePDCCH sets and the number of the candidate search spaces is the same as or less than that for the legacy CSS PDCCH, for Aggregation Level (AL)=64, the number of the candidate search spaces is generated based on AL=32 within one ePDCCH set and repeats in another ePDCCH set; and for AL<64, the number of the candidate search spaces is generated based on AL/2 within one ePDCCH set and repeats in another ePDCCH set, or is alternatively generated based on AL within one ePDCCH set.

Example 7 may include the subject matter of example 1 or any other examples herein, wherein the maximum AL for localized ePDCCH is enhanced to AL=32.

Example 8 may include the subject matter of example 1 or any other examples herein, wherein the UESS and the CSS for ePDCCH comprise two ePDCCH sets, each containing 8 RBs, and the two ePDCCH sets are configured by an evolved Node-B (eNB) with the following configuration:

Maximum AL is 64 for the UE, that is, one candidate SS for AL=64, two candidate SSs for AL=32, two/four candidate SSs for AL=16; or alternatively Maximum AL is 32 for the UE, that is, two candidate SSs for AL=32, two/four candidate SSs for AL=16, two/four candidate SSs for AL=8;

The remaining candidates are equally divided for smaller AL; and

The aggregation level is 4 levels or 5 levels.

Example 9 may include the subject matter of example 1 or any other examples herein, wherein the candidate search space reuses two distributed ePDCCH sets, while one candidate search space AL=64 is added, and one candidate of smaller AL is decreased by one.

Example 10 may include the subject matter of example 1 or any other examples herein, wherein the candidate search space focuses on the larger AL with 6 level ALs, ranging from AL=2 to AL=64.

Example 11 may include the subject matter of example 1 or any other examples herein, wherein the UESS and the CSS for ePDCCH comprise four ePDCCH sets, each containing 8 RBs, and the four ePDCCH sets are configured by an evolved Node-B (eNB) with the following configuration:

Two candidate SSs for AL=64;

Four candidate SSs for AL=32;

Four candidate SSs for AL=16;

The remaining candidates are equally divided for smaller AL;

The aggregation level is 4 levels or 5 levels;

For AL=64, two ePDCCH sets are associated by default, and within the two ePDCCH sets, the ePDCCH is generated based on AL=32 in one set, and repeated for the other set.

Example 12 may include the subject matter of example 1 or any other examples herein, wherein the UESS and the CSS for ePDCCH comprise two ePDCCH sets, each containing 16 RBs, and the two ePDCCH sets are configured by an evolved Node-B (eNB) with the following configuration:

Two candidate SSs for AL=64;

Four candidate SSs for AL=32;

Four candidate SSs for AL=16;

The remaining candidates are equally divided for smaller AL;

The aggregation level is 4 levels or 5 levels;

The enhanced Control Channel Element (eCCE) is numbered within one set, and the further eCCE (FeCCE) is obtained by concatenating across multiple eCCEs.

Example 13 may include the subject matter of example 1 or any other examples herein, wherein a legacy PDC- CHpdcch-candidateReductions parameter is reused in the UESS and the CSS for ePDCCH transmission, or alternatively a pdcch-candidateReductionAL6 parameter is introduced to the UESS and the CSS for ePDCCH transmission.

Example 14 may include the subject matter of example 1 or any other examples herein, wherein the transmission of DCI supports legacy DCI for WCE UE scheduling.

Example 15 may include the subject matter of example 1 or any other examples herein, wherein Format 1x is utilized for the WCE UE scheduling with the following configuration:
Format 1 for single input multiple output (SIMO) PDSCH scheduling with non-contiguous Resource Allocation (RA), which is supported for the WCE UE scheduling;
Format 1A for SIMO PDSCH scheduling with contiguous RA, which is supported for the WCE UE scheduling;
Format 1B for close-loop single rank transmission with contiguous RA for the WCE UE scheduling; or
Format 1D for compact scheduling of one PDSCH codeword with precoding and power offset information.

Example 16 may include a method based on a scheme about design the common search space in ePDCCH channel for WCE system, including:
CSS ePDCCH configuration;
Candidate search spaces;
16 RBs for CSS ePDCCH, including DCI format 1A only, DCI format 1A+DCI format 1C;
PRB allocation for CSS ePDCCH in the candidate search;
32 RBs for CSS ePDCCH, including DCI format 1A only, DCI format 1A+DCI format 1C;
Further enhanced eCCE;
Remaining detail;
SIB Period and Paging period.

Example 17 may include the method of example 16 or any other examples herein, wherein the ePDCCH configuration for CSS is indicated by eNB through SIB1 or MIB.

Example 18 may include the method of example 17 or any other examples herein, wherein for the parameter sub-framePattern, wherein:
The parameter may be configured by eNB as a legacy bit field;
The parameter is not defined, where each subframe is a valid subframe for ePDCCH reception to search CSS. Additionally, different DCIs for different broadcasting information are searched in different timing instants. E.g., DCI with SI-RNTI is searched during the SI window; DCI with PI-RNTI is searched during the paging occasion, DCI with RA-RNTI is searched during the RAR window occasion.

Example 19 may include the method of example 17 or any other examples herein, wherein for the parameter startSymbol, wherein:
The parameter may be indicated by CFI or pdsch-Start as a legacy bit field,
The parameter may be configured by eNB through SIB1 or MIB,
The field startSymbol will be applicable to CSS ePDCCH and the associated PDSCH, and/or the USS ePDCCH and the associated PDSCH.

Example 20 may include the method of example 17 or any other examples herein, wherein for the parameter setConfigToReleaseList and setConfigToAddModList, wherein:
It may be pre-defined, e.g., two sets are configured;
It may be configured by eNB through SIB1 or MIB.

Example 21 may include the method of example 17 or any other examples herein, wherein for EPDCCH-SetConfig, wherein:

setConfigId is pre-defined and the set configuration is implicitly associated with the configuration sequence, that is {set 0} follows {set 1};
transmissionType may be pre-defined as the distributed case, since only distributed cases can support the AL=32. Alternatively, it may be configured by eNB through SIB1 or MIB;
numberPRB-Pairs is pre-defined, e.g., 8 RBs for each set. Alternatively, it may be configured by eNB through SIB1 or MIB;
resourceBlockAssignment, it may be defined as a legacy resource allocation, resourceBlockAssignment, BIT STRING (SIZE(4 . . . 38)). Alternatively, it may be pre-defined in the unit of N contiguous distributed/localized VRBs, e.g., N may be 8, or 4. One flag may be configured to indicate to the UE whether the resource configuration is based on contiguous PRB or VRB. Alternatively, resourceBlockAssignment is hard coded, or pre-defined, be blindly detected together with the candidates.

Example 22 may include the method of example 17 or any other examples herein, wherein the dmrs-ScramblingSequenceInt, may be configured by eNB through SIB1/MIB, or pre-defined, e.g., the cell ID.

Example 23 may include the method of example 17 or any other examples herein, wherein the pucch-ResourceStartOffset is not necessary, since ACK/NACK is not necessary to be fed back for data configured by DCI in CSS.

Example 24 may include the method of example 17 or any other examples herein, wherein this parameter re-MappingQCL-ConfigId is not necessary or is optional, since TM10 cannot be supported in unlicensed system.

Example 25 may include the method of example 17 or any other examples herein, wherein the parameter csi-RS-ConfigZPId2 is optional, depending on eNB's implementation for puncturing ePDCCH or not, and UE will detect it without puncture information.

Example 26 may include the method of example 17 or any other examples herein, wherein the repetition times of the associated PDSCH may be configured by eNB through higher layer signaling:
Different repetition times may be configured for different entries, e.g., one repetition may be configured in one schedulingInforList; repetition for paging, RA, SI may be different.

Example 27 may include the method of example 17 or any other examples herein, wherein the pdcch-candidateReductions is not configured for CSS.

Example 28 may include the method of example 16 or any other examples herein, wherein the candidates number in CSS ePDCCH is the same or less than the legacy CSS PDCCH.

Example 29 may include the method of example 16 or any other examples herein, wherein a maximum of 16 RBs may be configured for CSS ePDCCH.

Example 30 may include the method of example 16 or any other examples herein, wherein the ePDCCH resource configuration has already been configured by eNB through high layer signaling, the candidates may be:
AL=64, one candidates, format 1A;
AL=32, two candidates, format 1A.

Example 31 may include the method of example 16 or any other examples herein, wherein the ePDCCH resource may be jointly encoded for blind detection and the ePDCCH resource for gap 1 and gap 2 may be allocated at separate physical resource with a total of 9 candidates, wherein:
AL=64, one candidate, format 1A, localized VRB;

AL=64, one candidate, format 1A, distributed VRB, $N_{gap,1}$;
AL=64, one candidate, format 1A, distributed VRB, $N_{gap,2}$;
AL=32, two candidates, format 1A, localized VRB;
AL=32, two candidates, format 1A, distributed VRB, $N_{gap,1}$;
AL=32, two candidates, format 1A, distributed VRB, $N_{gap,2}$.

Example 32 may include the method of example 16 or any other examples herein, wherein the ePDCCH resource may be jointly encoded for blind detection and the ePDCCH resource for gap 1 and gap 2 are allocated at the same physical resource with a total of 6 candidates, wherein:
AL=64, one candidate, format 1A, localized VRB;
AL=64, one candidate, format 1A, distributed VRB, $N_{gap,1}/N_{gap,1}$;
AL=32, two candidates, format 1A, localized VRB;
AL=32, two candidates, format 1A, distributed VRB, $N_{gap,1}/N_{gap,2}$.

Example 33 may include the method of example 16 or any other examples herein, wherein the ePDCCH resource for localized VRB comprises:
Pre-defined contiguous PRBs at one edge, e.g., 16PRBs from 0 to 15;
Pre-defined contiguous PRBs at two edges, e.g., 8 PRBs from 0 to 7, and 8 RBs from 92 to 99;
The PRBs for CSS ePDCCH is configured by eNBs.

Example 34 may include the method of example 16 or any other examples herein, wherein the ePDCCH resource for distributed VRB, when $N_{gap,1}$ and $N_{gap,2}$ share the same resource, comprises:
Pre-defined PRBs, that is PRB 0~2, PRB 24~26, PRB69~71, PRB 93~95, PRB 96~99;
The PRBs for CSS ePDCCH is configured by eNBs;
Gap1/gap2 share the same PRBs for ePDCCH that is, VRB 12~83, 72RBs, Example 35 may include the method of example 16 or any other examples herein, wherein the ePDCCH resource for distributed VRB, when $N_{gap,1}$ and $N_{gap,2}$ share the different resource blocks, comprises:
Pre-defined PRBs for $N_{gap,1}$, that is PRB 0~2, PRB 24~26, PRB 48~50, PRB 72~74, PRB 96~99; which corresponding to VRB 0~11. Alternatively, the PRB corresponds to VRB 84~95 may be configured. Here, 84VRBs may be configured;
Pre-defined PRBs for $N_{gap,2}$, that is PRB 0~2, PRB8~10, PRB 16~18, PRB 24~26, PRB 96~99, which corresponding to VRB 0~11. Alternatively, the PRB corresponds to VRB 84~95 may be configured. Here, 84VRBs may be configured, Example 36 may include the method of example 16 or any other examples herein, wherein the ePDCCH resource configuration has already been configured by eNB through high layer signaling, the candidates may be (in total, it's 7 or 9 candidates):
AL=64, one candidates, format 1A;
AL=32, two candidates, format 1A;
AL=32, two candidates, format 1C;
AL=16, two or four candidates, format 1C.

Example 37 may include the method of example 16 or any other examples herein, wherein the ePDCCH resource configuration has already been configured by eNB through high layer signaling, the candidates may be transparent to DCI format, wherein:
AL=64, one candidate;
AL=32, two candidates;
AL=16, two or three or four candidates.

Example 38 may include the method of example 16 or any other examples herein, wherein the ePDCCH resource may jointly be encoded for blind detection, where the ePDCCH resource for gap 1 and gap 2 may be allocated at separate physical resource, and one or more candidates may be searched among the candidates comprising:
AL=64, one candidate, format 1A, localized VRB;
AL=64, one candidate, format 1A, distributed VRB, $N_{gap,1}$;
AL=64, one candidate, format 1A, distributed VRB, $N_{gap,2}$;
AL=32, two candidates, format 1A, localized VRB;
AL=32, two candidates, format 1A, distributed VRB, $N_{gap,1}$;
AL=32, two candidates, format 1A, distributed VRB, $N_{gap,2}$;
AL=32, two candidates, format 1C, distributed VRB, $N_{gap,1}$;
AL=32, two candidates, format 1C, distributed VRB, $N_{gap,2}$;
AL=16, four candidates, format 1C, distributed VRB, $N_{gap,1}$;
AL=16, four candidates, format 1C, distributed VRB, $N_{gap,2}$.

Example 39 may include the method of example 16 or any other examples herein, wherein the ePDCCH resource may be jointly encoded for blind detection, where the ePDCCH resource for gap 1 and gap 2 may be allocated at the same physical resource, one or more candidates may be searched among the candidates comprising:
AL=64, one candidate, format 1A, localized VRB;
AL=64, one candidate, format 1A, distributed VRB;
AL=32, two candidates, format 1A, localized VRB;
AL=32, two candidates, format 1A, distributed VRB;
AL=32, two candidates, format 1C, distributed VRB;
AL=16, four candidates, format 1C, distributed VRB.

Example 40 may include the method of example 16 or any other examples herein, wherein maximum 32 RBs may be utilized for CSS ePDCCH. The candidate number at 16RBs is doubled.

Example 41 may include the method of example 16 or any other examples herein, wherein the candidate may be DCI format 1A only, wherein:
AL=64, two candidates;
AL=32, two or four candidates;
AL=16, two or four or eight candidates.

Example 42 may include the method of example 16 or any other examples herein, wherein the candidate may be DCI format 1A and DCI format 1C, wherein:
AL=64, two candidates for DCI format 1A;
AL=32, four candidates for DCI format 1A;
AL=32, two candidates for DCI format 1C;
AL=16, four candidates for DCI format 1C.

Example 43 may include the method of example 16 or any other examples herein, wherein the candidate may be transparent to DCI format, wherein:
AL=64, two candidates;
AL=32, two candidates;
AL=16, two candidates.

Example 44 may include the method of example 16 or any other examples herein, wherein for DCI format 1A where the ePDCCH resources for gap 1 and gap 2 are allocated at the same physical resource. In total, there are 6 candidates, wherein:
AL=64, two candidates, format 1A, localized VRB;

AL=64, two candidates, format 1A, distributed VRB, $N_{gap,1}/N_{gap,1}$;

AL=32, four candidates, format 1A, localized VRB;

AL=32, four candidates, format 1A, distributed VRB, $N_{gap,1}/N_{gap,2}$.

Example 45 may include the method of example 16 or any other examples herein, wherein the RE mapping to eCCE reuses the legacy rule as the incumbent LTE system, and the mapping is restricted within one set.

Example 46 may include the method of example 16 or any other examples herein, wherein for AL<=64, the candidates are confined within one set, for AL=64, the association rule is pre-defined or configured by eNB through high layer signaling. E.g., the set 0 is associated with set 1, set 2 is associated with set 3. When performing AL=64, the ePDCCH on set 0 is repeated in the set 1.

Example 47 may include the method of example 16 or any other examples herein, wherein the further enhanced eCCE may be concatenated by eCCEs of two sets in the distributed manner or localized manner.

The eCCE on set 0 may be numbered as $\#eCCE_{0,0}$ $\#eCCE_{0,1}$ ... $\#eCCE_{0,31}$, and the eCCE set 1 may be number as $\#eCCE_{1,0}$ $\#eCCE_{1,1}$ ... $\#eCCE_{1,31}$. The aggregated FeCCE may be $\#eCCE_{0,0}$ $\#eCCE_{0,1}$ ... $\#eCCE_{0,31}$, $\#eCCE_{1,0}$ $\#eCCE_{1,1}$ ... $\#eCCE_{1,31}$, or $\#eCCE_{0,0}$ $\#eCCE_{1,0}$ $\#eCCE_{0,1}$ $\#eCCE_{1,1}$ ... $\#eCCE_{0,31}$ $\#eCCE_{1,31}$.

Example 48 may include the method of example 16 or any other examples herein, wherein for 8RBs+8RBs to support AL=64. It may be repeated by 2 AL=32, where the AL=32 reuses the legacy physical layer procedure.

Example 49 may include the method of example 16 or any other examples herein, wherein partial subframe is not allowed for ePDCCH CSS. Since the PDSCH starts at the same subframe as DCI, if repetition is applied, the available resource at two different subframes is not even, making MCS selection difficult.

Cross-carrier scheduling. In embodiments, partial subframe is not allowed for ePDCCH CSS. Since the PDSCH starts at the same subframe as DCI, if repetition is applied, the available resource at two different subframes is not even, making MCS selection difficult;

Content. In embodiments, one or more entries may be supported in CSS ePDCCH:

DCI scrambled by SI-RNTI;
DCI scrambled by PI-RNTI;
DCI scrambled by RA-RNTI;
DCI scrambled by TPC-PUCCH-RNTI;
DCI scrambled by TPC-PUSCH-RNTI.

Example 50 may include the method of example 16 or any other examples herein, wherein for SI transmission, the schedulingInfoList is configured by eNB through SIB1/2.

Example 51 may include the method of example 16 or any other examples herein, wherein for WCE, the period and SIB type is configured:

si_periodicity/sib_MappingInfo may be the same as legacy non-WCE;

si_periodicity/sib_MappingInfo may be the separated as legacy non-WCE.

Example 52 may include the method of example 16 or any other examples herein, wherein for si_WindowLength may be configured:

si_WindowLength may be the either the same or different as legacy non-WCE.

When timing repetition on PDSCH is applied, si_WindowLength may be utilized to constrain the ePDCCH and the starting PDSCH subframe; alternatively, si_WindowLength may be utilized to constrain the ending PDSCH subframe. In the latter case, PDSCH for SI may be not be scheduled later than $N_{end}-N_{rep}+1$, where $N_{end}$ is the ending subframe of one window, and $N_{rep}$ the repetition number.

Example 53 may include the method of example 16 or any other examples herein, wherein for WCE, the starting subframe is calculated based on the PO and PF, and the repetition may be indicated by DCI or RRC configured.

Example 54 may include an apparatus comprising means to perform one or more elements of a method described in or related to any of examples 16-53, or any other methods or processes described herein.

Example 55 may include one or more non-transitory computer-readable media comprising instructions to cause an electronic device, upon execution of the instructions by one or more processors of the electronic device, to perform one or more elements of a method described in or related to any of examples 16-53, or any other methods or processes described herein.

Example 56 may include an apparatus comprising logic, modules, or circuitry to perform one or more elements of a method described in or related to any of examples 16-53, or any other methods or processes described herein.

Example 57 may include a method, technique, or process as described in or related to any of examples 16-53, or portions or parts thereof.

Example 58 may include an apparatus comprising: one or more processors and one or more computer readable media comprising instructions that, when executed by the one or more processors, cause the one or more processors to perform the method, techniques, or process as described in or related to any of examples 16-53, or portions thereof.

Example 59 may include a signal as described in or related to any of examples 16-53, or portions or parts thereof.

Example 60 may include a signal in a wireless network as shown and described herein.

Example 61 may include a method of communicating in a wireless network as shown and described herein.

Example 62 may include a system for providing wireless communication as shown and described herein.

Example 63 may include a device for providing wireless communication as shown and described herein.

Example 64 may include an apparatus of a user equipment (UE) comprising: an interface configured to receive configuration information of a Search Space (SS) for Machine-type communications Physical Downlink Control Channel (MPDCCH) from a radio-frequency (RF) circuitry; and a processor configured to monitor the SS for an MPDCCH transmission; wherein the interface and/or the processor is adaptable to support a frequency hopping Internet of Things (IoT) system, and the MPDCCH transmission is restricted with starting N1 downlink subframes, N1 being configured by an evolved Node-B (eNB) through high layer signaling, and the starting N1 downlink subframes are less than the length of dwell time of a data channel.

Example 65 may include the subject matter of example 64 or any other examples herein, wherein the time position for MPDCCH search space may span the whole downlink subframe within one data channel, wherein: the legacy eMTC system may be reused, where the starting subframe is associated with the corresponding repetition times of MPDCCH; the starting subframe may be a floating subframe after the presence signal. Or it may be an absolute subframe.

Example 66 may include the subject matter of example 64 or any other examples herein, wherein one DCI can schedule one or more than one PDSCH/PUSCH subframes, wherein: the PDSCH/PUSCH may or may not be repeated; and the scheduled multiple PDSCH(s)/PUSCH(s) have contiguous HARQ IDs, while the HARQ of the first scheduled PDSCH/PUSCH is explicitly scheduled in the DCI.

Example 67 may include the subject matter of example 64 or any other examples herein, wherein the repetition level to monitor in an SS is indicated via the configuration of the maximum repetition level to monitor, Rmax.

Example 68 may include the method of example 67 or any other examples herein, wherein Rmax may be a fixed value, e.g., 8 or 16.

Example 69 may include the subject matter of example 64 or any other examples herein, wherein the maximum repetition of UE SS is 8, wherein:

the Rmax may be {1, 2, 4, 8} and is configured by eNB through RRC signaling. For each UE, the search space is blindly detected with the SS with RL<=Rmax;

the SS for UESS is illustrated in the following table:

|  |  | {AL, RL, #BDs} |
|---|---|---|
| 2 + 4 PRBs | set with 2PRBs | {2, 1, 1}, {4, 1, 1} |
|  |  | {4, 2, 1}, {8, 2, 1} |
|  | Set with 4 PRBs | {8, 1, 2}, {16, 1, 1} |
|  |  | {8, 2, 2}, {16, 2, 1} |
|  |  | {8, 4, 1}, {16, 4, 1} |
|  | 2 + 4 PRB set | {24, 1, 1}, {24, 2, 1}, |
|  |  | {24, 4, 1}, {24, 8, 1} |
| 2 PRBs |  | {2, 1, 1}, {4, 1, 1}, {8, 1, 1} |
|  |  | {2, 2, 2}, {4, 2, 1}, {8, 2, 1} |
|  |  | {2, 4, 2}, {4, 4, 1}, {8, 4, 1} |
|  |  | {2, 8, 2}, {4, 8, 1}, {8, 8, 1} |
| 4 PRBs |  | {2, 1, 1}, {4, 1, 1}, {8, 1, 1}, {16, 1, 1} |
|  |  | {2, 2, 1}, {4, 2, 1}, {8, 2, 1}, {16, 2, 1} |
|  |  | {2, 4, 1}, {4, 4, 1}, {8, 4, 1}, {16, 4, 1} |
|  |  | {2, 8, 1}, {4, 8, 1}, {8, 8, 1}, {16, 8, 1} |

Example 70 may include the subject matter of example 64 or any other examples herein, wherein the maximum repetition of UE SS is 8, wherein:

the Rmax may be {1, 2, 4, 8} and is configured by eNB through RRC signaling. For each UE, the search space is blindly detected with the SS with RL<=Rmax;

the SS for UESS is illustrated in the following table:

|  |  | {AL, RL, #BDs} |
|---|---|---|
| 2 + 4 PRBs | set with 2PRBs | {2, 1, 1}, {4, 1, 1} |
|  |  | {4, 2, 1}, {8, 2, 1} |
|  | Set with 4 PRBs | {8, 1, 2}, {16, 1, 1} |
|  |  | {8, 2, 2}, {16, 2, 1} |
|  |  | {8, 4, 1}, {16, 4, 1} |
|  | 2 + 4 PRB set | {24, 1, 1}, {24, 2, 1}, |
|  |  | {24, 4, 1}, {24, 8, 1} |
| 2 PRBs |  | {2, 1, 1}, {4, 1, 1}, {8, 1, 1} |
|  |  | {2, 2, 2}, {4, 2, 1}, {8, 2, 1} |
|  |  | {2, 4, 2}, {4, 4, 1}, {8, 4, 1} |
|  |  | {2, 8, 2}, {4, 8, 1}, {8, 8, 1} |
| 4 PRBs |  | {2, 1, 1}, {4, 1, 1}, {8, 1, 1}, {16, 1, 1} |
|  |  | {2, 2, 1}, {4, 2, 1}, {8, 2, 1}, {16, 2, 1} |
|  |  | {2, 4, 1}, {4, 4, 1}, {8, 4, 1}, {16, 4, 1} |
|  |  | {2, 8, 1}, {4, 8, 1}, {8, 8, 1}, {16, 8, 1} |

Example 71 may include the subject matter of example 64 or any other examples herein, wherein only 2+4 PRB sets are configured, where besides the UESS, the maximum repetition may be:

different UEs may be configured with different 2 PRBs, and 4 PRBs;

the BDs for UESS may be further simplified, that is maximum aggregation level may be time repeated, while the other aggregation levels, other than the maximum, no time repetition is necessary.

|  |  | {AL, RL, #BDs} |
|---|---|---|
| 2 + 4 PRBs | set with 2PRBs (3BDs) | {2, 1, 2}, {4, 1, 1} |
|  | set with 4 PRBs (7-9 BDs) | {2, 1, 2/3/4}, {4, 1, 2/3/4}, {8, 1, 2}, {16, 1, 1}, |
|  | 2 + 4 PRB set (4BDs) | {24, 1, 1}, {24, 2, 1}, {24, 4, 1}, {24, 8, 1} |

Example 72 may include the subject matter of example 64 or any other examples herein, wherein the maximum repetition may be 16, and $R_{max}$ may be {1, 2, 4, 8, 16}, which is configured by eNB through RRC signaling;

the search space is illustrated in the following table:

|  |  | {AL, RL, #BDs} |
|---|---|---|
| 2 + 4 PRBs | set with 2PRBs | {2, R1, 1}, {4, R1, 1} |
|  |  | {4, R2, 1}, {8, R2, 1} |
|  | Set with 4 PRBs | {8, R1, 2}, {16, R1, 1} |
|  |  | {8, R2, 2}, {16, R2, 1} |
|  |  | {8, R3, 1}, {16, R3, 1} |
|  | 2 + 4 PRB set | {24, R1, 1}, {24, R2, 1}, |
|  |  | {24, R3, 1}, {24, R4, 1} |
| 2 PRBs |  | {2, R1, 2}, {4, R1, 1}, {8, R1, 1} |
|  |  | {2, R2, 2}, {4, R2, 1}, {8, R2, 1} |
|  |  | {2, R3, 2}, {4, R3, 1}, {8, R3, 1} |
|  |  | {2, R4, 2}, {4, R4, 1}, {8, R4, 1} |
| 4 PRBs |  | {2, R1, 1}, {4, R1, 1}, {8, R1, 1}, {16, R1, 1} |
|  |  | {2, R2, 1}, {4, R2, 1}, {8, R2, 1}, {16, R2, 1} |
|  |  | {2, R3, 1}, {4, R3, 1}, {8, R3, 1}, {16, R3, 1} |
|  |  | {2, R4, 1}, {4, R4, 1}, {8, R4, 1}, {16, R4, 1} |

Example 73 may include the subject matter of example 64 or any other examples herein, wherein only 2+4 PRB sets are configured, where besides the UESS, the maximum repetition may be:

different UEs may be configured with different 2 PRBs, and 4 PRBs;

the BDs for UESS may be further simplified, that is maximum aggregation level may be time repeated, while the other aggregation levels, other than the maximum, no time repetition is necessary.

|  |  | {AL, RL, #BDs} |
|---|---|---|
| 2 + 4 PRBs | set with 2PRBs (3BDs) | {2, R1, 2}, {4, R1, 1} |
|  | set with 4 PRBs (7~9 BDs) | {2, R1, 2/3/4}, {4, R1, 2/3/4}, {8, R1, 2}, {16, R1, 1} |
|  | 2 + 4 PRB set (4BDs) | {24, R1, 1}, {24, R2, 1}, {24, R3, 1}, {24, R4, 1} |
| where |  |  |
| Rmax = 1 |  | R1 = 1 |
| Rmax = 2 |  | R1 = 1, R2 = 2 |
| Rmax = 4 |  | R1 = 1, R2 = 2, R3 = 4 |
| Rmax >= 8 |  | R1 = Rmax/8, R2 = Rmax/4, R3 = Rmax/2, R4 = Rmax |

Example 74 may include the subject matter of example 64 or any other examples herein, wherein when the Rmax is fixed to 16, then {R1/R2/R3/R4}={1/4/8/16}.

Example 75 may include the method of example 64 or any other examples herein, wherein there is no type 1 and type 2 CSS, and further type 1 and type 2 have merged into one type, a new type 1 CSS.

Example 76 may include the subject matter of example 64 or any other examples herein, wherein the common search space for CSS, e.g., for a new type 1 CSS is:
6 PRBs with distributed transmission;
4 BDs, that is {(24, r1, 1), (24, r2, 1), (24, r3, 1), (24, r4, 1)}. Or 7 BDs, that is {(24, r1, 1), (24, r2, 1), (24, r3, 1), (24, r4, 1), (16, r)};
the maximum repetition may be configured by eNB, or by default as 8 or 16, where the following difference of repetition times:

| $r_{max}$ | r1 | r2 | r3 | r4 |
|---|---|---|---|---|
| 16 | 1 | 4 | 8 | 16 |
| 8 | 1 | 2 | 4 | 8 | the paging/random access/direct indication may use the same maximum repetition times, $r_{max}$.

Example 77 may include the subject matter of example 64 or any other examples herein, wherein the SI may be scheduled by DCI in CSS, wherein: to save DCI transmission overhead, the time resource for SI transmission is indicated by eNB through high layer signaling; alternatively, DCI may use the DCI for unicast DCI scheduling, or dedicated DCI for paging, or new type1 DCI. The maximum repetition for DCI reuses that number for DCI scheduling, or is separately configured.

Example 78 may include an apparatus comprising: means for determining a search space and subframe configuration for a machine-type communications physical downlink control channel (MPDCCH) of a frequency hopping IoT system; and means for signaling a message including the configuration.

Example 79 may include the apparatus of example 78 or any other examples herein, wherein the MPDCCH has a length of N1 downlink subframes, wherein the configuration indicates N1, N1 is smaller than a dwell time length of a data channel, and the means for signaling is for signaling the configuration via high layer signaling wherein the higher layer signaling comprises radio resource control (RRC) signaling or the like.

Example 80 may include the apparatus of example 79 or any other examples herein, wherein a subframe offset is explicitly indicated by downlink control information (DCI) corresponding to physical downlink shared channel (PDSCH) scheduling or physical uplink shared channel (PUSCH) scheduling.

Example 81 may include the apparatus of example 78 or any other examples herein, wherein a time position for a search space of the MPDCCH spans a whole downlink subframe within one data channel.

Example 82 may include the apparatus of example 81 or any other examples herein, wherein a starting subframe is associated with corresponding repetition times of the MPDCCH; and the starting subframe is a floating subframe after a presence signal or an absolute subframe.

Example 83 may include the apparatus of example 78 or any other examples herein, wherein one DCI indicates a schedule of one or more than one PDSCH/PUSCH subframes, wherein the PDSCH/PUSCH may or may not be repeated; and scheduled PDSCH(s)/PUSCH(s) have contiguous hybrid automatic repeat request (HARQ) identifiers (IDs), while a HARQ ID of a first scheduled PDSCH/PUSCH is explicitly scheduled in the DCI.

Example 84 may include the apparatus of example 80 or any other examples herein, wherein a repetition level to monitor in a search space (SS) are indicated via configuration of a maximum repetition level to monitor, Rmax.

Example 85 may include the apparatus of example 84 or any other examples herein, wherein the Rmax is a fixed value of 8 or 16.

Example 86 may include the apparatus of examples 84 or 85 or both or any other examples herein, wherein when a maximum repetition of a user equipment SS (UESS) is 8, the Rmax is {1, 2, 4, 8}, and Rmax is indicated by the configuration, the means for signaling is for signaling the configuration via RRC signaling.

Example 87 may include the apparatus of example 86 or any other examples herein, wherein for each UE, the UESS is blindly detected in an SS with RL<=Rmax, and the SS for UESS is based on the following table:

| | | {AL, RL, #BDs} |
|---|---|---|
| 2 + 4 PRBs | set with 2PRBs | {2, 1, 1}, {4, 1, 1} |
| | | {4, 2, 1}, {8, 2, 1} |
| | Set with 4 PRBs | {8, 1, 2}, {16, 1, 1} |
| | | {8, 2, 2}, {16, 2, 1} |
| | | {8, 4, 1}, {16, 4, 1} |
| | 2 + 4 PRB set | {24, 1, 1}, {24, 2, 1}, |
| | | {24, 4, 1}, {24, 8, 1} |
| 2 PRBs | | {2, 1, 1}, {4, 1, 1}, {8, 1, 1} |
| | | {2, 2, 2}, {4, 2, 1}, {8, 2, 1} |
| | | {2, 4, 2}, {4, 4, 1}, {8, 4, 1} |
| | | {2, 8, 2}, {4, 8, 1}, {8, 8, 1} |
| 4 PRBs | | {2, 1, 1}, {4, 1, 1}, {8, 1, 1}, {16, 1, 1} |
| | | {2, 2, 1}, {4, 2, 1}, {8, 2, 1}, {16, 2, 1} |
| | | {2, 4, 1}, {4, 4, 1}, {8, 4, 1}, {16, 4, 1} |
| | | {2, 8, 1}, {4, 8, 1}, {8, 8, 1}, {16, 8, 1} |

Example 88 may include the apparatus of example 86 or any other examples herein, wherein for each UE, the UESS is blindly detected in an SS with RL<=$R_{max}$, and the SS for UESS is based on the following table:

| | | {AL, RL, #BDs} |
|---|---|---|
| 2 + 4 PRBs | set with 2PRBs | {2, 1, 1}, {4, 1, 1} |
| | | {4, 2, 1}, {8, 2, 1} |
| | Set with 4 PRBs | {8, 1, 2}, {16, 1, 1} |
| | | {8, 2, 2}, {16, 2, 1} |
| | | {8, 4, 1}, {16, 4, 1} |
| | 2 + 4 PRB set | {24, 1, 1}, {24, 2, 1}, |
| | | {24, 4, 1}, {24, 8, 1} |
| 2 PRBs | | {2, 1, 1}, {4, 1, 1}, {8, 1, 1} |
| | | {2, 2, 2}, {4, 2, 1}, {8, 2, 1} |
| | | {2, 4, 2}, {4, 4, 1}, {8, 4, 1} |
| | | {2, 8, 2}, {4, 8, 1}, {8, 8, 1} |
| 4 PRBs | | {2, 1, 1}, {4, 1, 1}, {8, 1, 1}, {16, 1, 1} |
| | | {2, 2, 1}, {4, 2, 1}, {8, 2, 1}, {16, 2, 1} |
| | | {2, 4, 1}, {4, 4, 1}, {8, 4, 1}, {16, 4, 1} |
| | | {2, 8, 1}, {4, 8, 1}, {8, 8, 1}, {16, 8, 1} |

Example 89 may include the apparatus of example 78 or any other examples herein, wherein only 2+4 physical resource blocks (PRB) sets are configured, where besides the UESS, the maximum repetition may include: different UEs may be configured with different 2 PRBs, and 4 PRBs; the BDs for UESS may be further simplified, that is maximum aggregation level may be time repeated, while the other aggregation levels, other than the maximum, no time repetition is necessary, wherein:

|  |  | {AL, RL, #BDs} |
|---|---|---|
| 2 + 4 PRBs | set with 2PRBs (3BDs) | {2, 1, 2}, {4, 1, 1} |
|  | set with 4 PRBs (7~9 BDs) | {2, 1, 2/3/4}, {4, 1, 2/3/4}, {8, 1, 2}, {16, 1, 1} |
|  | 2 + 4 PRB set (4BDs) | {24, 1, 1}, {24, 2, 1}, {24, 4, 1}, {24, 8, 1} |

Example 90 may include the apparatus of example 78 or 86, or any other examples herein, wherein when a maximum repetition of a UESS is 16, $R_{max}$ is {1, 2, 4, 8, 16}, $R_{max}$ is indicated by the configuration, the means for signaling is for signaling the configuration via RRC signaling; and the search space is based on the following table:

|  |  | {AL, RL, #BDs} |
|---|---|---|
| 2 + 4 PRBs | set with 2PRBs | {2, R1, 1}, {4, R1, 1} |
|  |  | {4, R2, 1}, {8, R2, 1} |
|  | Set with 4 PRBs | {8, R1, 2}, {16, R1, 1} |
|  |  | {8, R2, 2}, {16, R2, 1} |
|  |  | {8, R3, 1}, {16, R3, 1} |
|  | 2 + 4 PRB set | {24, R1, 1}, {24, R2, 1}, |
|  |  | {24, R3, 1}, {24, R4, 1} |
| 2 PRBs |  | {2, R1, 2}, {4, R1, 1}, {8, R1, 1} |
|  |  | {2, R2, 2}, {4, R2, 1}, {8, R2, 1} |
|  |  | {2, R3, 2}, {4, R3, 1}, {8, R3, 1} |
|  |  | {2, R4, 2}, {4, R4, 1}, {8, R4, 1} |
| 4 PRBs |  | {2, R1, 1}, {4, R1, 1}, {8, R1, 1}, {16, R1, 1} |
|  |  | {2, R2, 1}, {4, R2, 1}, {8, R2, 1}, {16, R2, 1} |
|  |  | {2, R3, 1}, {4, R3, 1}, {8, R3, 1}, {16, R3, 1} |
|  |  | {2, R4, 1}, {4, R4, 1}, {8, R4, 1}, {16, R4, 1} |

Example 91 may include the apparatus of example 78 or any other examples herein, wherein only 2+4 PRB sets are configured, where besides the UESS, a maximum repetition of different UEs may be configured with different 2 PRBs, and 4 PRBs; and the BDs for UESS may be further simplified, that is maximum aggregation level may be time repeated, while the other aggregation levels, other than the maximum, no time repetition is necessary, wherein:

|  |  | {AL, RL, #BDs} |
|---|---|---|
| 2 + 4 PRBs | set with 2PRBs (3BDs) | {2, R1, 2}, {4, R1, 2} |
|  | set with 4 PRBs (7~9 BDs) | {2, R1, 2/3/4}, {4, R1, 2/3/4}, {8, R1, 2}, {16, R1, 1} |
|  | 2 + 4 PRB set (4BDs) | {24, R1, 1}, {24, R2, 1}, {24, R3, 1}, {24, R4, 1} |
| where |  |  |
| Rmax = 1 |  | R1 = 1 |
| Rmax = 2 |  | R1 = 1, R2 = 2 |
| Rmax = 4 |  | R1 = 1, R2 = 2, R3 = 4 |
| Rmax <= 8 |  | R1 = Rmax/8, R2 = Rmax/4, R3 = Rmax/2, R4 = Rmax |

Example 92 may include the apparatus of example 78 or any other examples herein, wherein when Rmax is fixed to 16, the {R1/R2/R3/R4}={1/4/8/16}.

Example 93 may include the method of example 78 or any other examples herein, wherein there is no type 1 and type 2 CSS, while the type 1 and type 2 merge into one type, that new type 1 CSS.

Example 94 may include the apparatus of example 78 or any other examples herein, wherein the common search space for CSS, e.g., for new type 1 CSS is: 6 PRBs with distributed transmission; 4 BDs, that is {(24, r1, 1), (24, r2, 1), (24, r3, 1), (24, r4, 1)}. Or 7 BDs, that is {(24, r1, 1), (24, r2, 1), (24, r3, 1), (24, r4, 1), (16, r)}; a maximum repetition may be configured by eNB, or by default as 8 or 16, where the repetition times are as follows:

| $r_{max}$ | r1 | r2 | r3 | r4 |
|---|---|---|---|---|
| 16 | 1 | 4 | 8 | 16 |
| 8 | 1 | 2 | 4 | 8 | the paging/random access/direct indication may use the same maximum repetition times, rmax.

Example 95 may include the apparatus of example 78 or any other examples herein, wherein system information (SI) is to be scheduled by DCI in CSS.

Example 96 may include the apparatus of example 95 or any other examples herein, wherein a time resource for SI transmission is indicated by the configuration, and the means for signaling is for signaling the configuration via higher layer signaling.

Example 97 may include the apparatus of example 95 or any other examples herein, wherein the means for signaling is for signaling the configuration in DCI including one or more of: DCI for unicast DCI scheduling, dedicated DCI for paging, or new type1 DCI, wherein a maximum repetition for DCI reuses that number for DCI scheduling, or is separately configured.

Example 98 may include the apparatus of examples 78 to 97 or any other examples herein, wherein the apparatus is implemented in or by an evolved NodeB (eNB) or a next generation NodeB (gNB).

Example 99 may include an apparatus comprising means to perform one or more elements of a method described in or related to any of examples 64 to 98, or any other methods or processes described herein.

Example 100 may include one or more non-transitory computer-readable media comprising instructions to cause an electronic device, upon execution of the instructions by one or more processors of the electronic device, to perform one or more elements of a method described in or related to any of examples 64 to 98, or any other methods or processes described herein.

Example 101 may include an apparatus comprising logic, modules, or circuitry to perform one or more elements of a method described in or related to any of examples 64 to 98, or any other methods or processes described herein.

Example 102 may include a method, technique, or process as described in or related to any of examples 64 to 98, or portions or parts thereof.

Example 103 may include an apparatus comprising: one or more processors and one or more computer readable media comprising instructions that, when executed by the one or more processors, cause the one or more processors to perform the method, techniques, or process as described in or related to any of examples 64-98, or portions thereof.

Example 104 may include a signal as described in or related to any of examples 64 to 98, or portions or parts thereof.

Example 105 may include an apparatus of a user equipment (UE) comprising: a radio-frequency (RF) interface configured to receive configuration information for Physical Downlink Control Channel (PDCCH) transmission with a reference signal on a contiguous downlink/uplink configuration, and a processor configured to monitor the PDCCH transmission; wherein the Downlink (DL) transmission is finished within one dwell time, and the PDCCH transmission comprises a System Information (SI) transmission including an essential System Information Block (SIB) and remaining SIB1.

Example 106 may include the subject matter of example 105 or any other examples herein, wherein CRS is not present at the resource allocated for TM9 PDSCH, and the MPDCCH:
- TM9 PDSCH and MPCCH reuse the legacy DMRS pattern for channel estimation;
- All the REs are utilized for TM9 PDSCH and MPDCCH transmission. An example is illustrated in the FIG. 1, where the gray grids are all PDSCH REs, no REs for CRS, and no OFDMs is necessary to be reserved for PDCCH.
- The CRS will be transmitted in the TM1/2/6 PDSCH, PBCH subframes.

Example 107 may include the subject matter of example 105 or any other examples herein, wherein CRS will be utilized as the reference signal for PDSCH and MPCCH:
- TM9 is not supported;
- Only one and two antennas ports are supported in the system;
- The MPDCCH utilize the CRS pattern as the DMRS pattern, where port 107, 108 are associated with CRS port 0 and port1.

Example 108 may include the subject matter of example 105 or any other examples herein, wherein the time is reserved for downlink to uplink switching:
- The OFDM symbol of the downlink subframe at the downlink-uplink switch point may be punctured. This DL subframe is the DwPTS, the exactly remaining OFDM symbols may be configured by eNB through high layer signaling. The OFDM symbols at that special downlink subframe may be {3, 6, 9, 10, 11, 12, 14}.
- Alternatively, the OFDM symbols for special downlink subframe is fixed to 2 OFDM symbols.
- For UE decoding, it may be rate-matched, or punctured.

Example 109 may include the subject matter of example 105 or any other examples herein, wherein the essential SIB transmission may be:
- 6 RBs, followed the PBCH;
- 2~3 time domain repetition;
- TBS for essential SI:
  - Option1. fixed to 32 or 30;
  - Option2. configured by MIB using the reserved state of SIB1-BR, e.g. 19 for 24, 20 for 32, 21 for 40.

Example 110 may include the subject matter of example 105 or any other examples herein, wherein the remaining SIB1 transmission reuses the 5-bits schedulingInfoSIB1-BR in MIB
- TBS;
- 4/8/16 time repetition.

Example 111 may include the subject matter of example 105 or any other examples herein, wherein the remaining SIB1 is transmitted on the contiguous valid downlink SFs, since according to the current agreement, the downlink transmission is completed within one COT.

Example 112 may include the subject matter of example 105 or any other examples herein, wherein the SIB1-BR transmission period is configured:
- The period may be configured by the reserved states of schedulingInfoSIB1-BR;
- The period time may be 80 ms, 160 ms 320 ms, 640 ms, 1280 ms, 2560 ms, 5120 ms;
- The starting subframe may be based on absolute subframe index. If the starting time of n*80 ms, where n>=0 is the starting time of anchor channel, the starting time of remaining SIB1-BR may be n*80 ms+$T_{dwell,anchor}$, where $T_{dwell,anchor}$ is the dwell time of anchor channel, e.g. 5 ms. For instance, the starting time of remaining SIB1-BR is 85 ms, 165 ms;
- The starting subframe may be based on the floating subframe index, that is n*80 ms+$T_{dwell,anchor}$+n1, where n1 depends on the subframe for (e)CCA, and presence signal transmission.

Example 113 may include the subject matter of example 105 or any other examples herein, wherein the transmission of other SIBx, precluding the essential SIB, and remaining SIB1-BR, is configured in the remaining SIB1-BR:
- MCS; QPSK; TBS;
- Subframe offset;
- Number of repetitions within SI window;
- Time interval between repetitions;
- The SI window can reuse the legacy.

Example 114 may include an apparatus comprising means to perform one or more elements of a method described in or related to any of examples 105-113, or any other methods or processes described herein.

Example 115 may include one or more non-transitory computer-readable media comprising instructions to cause an electronic device, upon execution of the instructions by one or more processors of the electronic device, to perform one or more elements of a method described in or related to any of examples 105-113, or any other methods or processes described herein.

Example 116 may include an apparatus comprising logic, modules, or circuitry to perform one or more elements of a method described in or related to any of examples 105-113, or any other methods or processes described herein.

Example 117 may include a method, technique, or process as described in or related to any of examples 105-113, or portions or parts thereof.

Example 118 may include an apparatus comprising: one or more processors and one or more computer readable media comprising instructions that, when executed by the one or more processors, cause the one or more processors to perform the method, techniques, or process as described in or related to any of examples 105-113, or portions thereof.

Example 119 may include a signal as described in or related to any of examples 105-113, or portions or parts thereof.

The foregoing description of one or more implementations provides illustration and description, but is not intended to be exhaustive or to limit the scope of the disclosure to the precise form disclosed. Modifications and variations are possible in light of the above teachings or may be acquired from practice of various implementations of the disclosure.

What is claimed is:

1. A user equipment (UE), comprising:
an interface configured to receive configuration information of a UE specific Search Space (UESS) and a Common Search Space (CSS) for enhanced Physical Downlink Control Channel (ePDCCH) from a radio-frequency (RF) circuitry,
wherein the UESS and the CSS comprise four ePDCCH sets, the four ePDCCH sets being defined based upon aggregation levels (ALs), repetition levels (RLs), and numbers of blind decodings (#BDs),
wherein each ePDCCH set from among the four ePDCCH sets comprises 8 Resource Blocks (RBs), and
wherein the four ePDCCH sets are configured by an access node (AN) and comprise:

Two candidate Search Spaces (SSs) for an AL equal to 64,
Four candidate SSs for an AL equal to 32,
Four candidate SSs for an AL equal to 16,
Remaining candidate SSs are equally divided for smaller AL,
The ALs include 4 different levels or 5 different levels, and
For the AL equal to 64, two ePDCCH sets from among the four ePDCCH sets are associated by default, and within the two ePDCCH sets, the ePDCCH is generated based on the AL equal to 32 in one ePDCCH set from among the two ePDCCH sets, and repeated for another ePDCCH set from among the two ePDCCH sets; and
a processor configured to monitor the UESS and the CSS for an ePDCCH transmission in accordance one or more ePDCCH sets from among the four ePDCCH sets;
wherein at least one of the interface or the processor is further configured to support a wideband coverage enhancement (WCE), and
wherein the configuration information comprises information for configuration of one or more of:
a candidate SS,
an RB for the UESS and the CSS,
a search space reduction, or
a transmission of Downlink Control Information (DCI).

2. The UE of claim 1, wherein the UESS and the CSS are indicated by a parameter startSymbol,
wherein the parameter startSymbol is indicated by a Control Format Indicator (CFI) or a pdsch-Start parameter, or is configured by the AN through one of a System Information Block 1 (SIB1), a Master Information Block (MIB) or a Radio Resource Control (RRC) message, and
wherein the parameter startSymbol is applicable to the CSS and its associated Physical Downlink Control Channel (PDSCH) or the UESS and its associated PDSCH.

3. The UE of claim 1, wherein the UESS and the CSS are indicated by a parameter setConfigToReleaseList and a parameter setConfigToAddModList, and
wherein the UESS and the CSS are pre-defined if two ePDCCH sets are configured for the UESS and the CSS, or the UESS and the CSS are configured by the AN through one of a System Information Block 1 (SIB1), a Master Information Block (MIB) or a Radio Resource Control (RRC) message.

4. The UE of claim 1, wherein the UESS and the CSS are indicated by a parameter EPDCCH-SetConfigId, which takes a value from among 0, 1, 2, or 3, while two ePDCCH sets configured for the UESS and the CSS are associated together.

5. The UE of claim 4, wherein the parameter EPDCCH-SetConfigId comprises:
setConfigId which is pre-defined and implicitly associated with a configuration sequence;
transmissionType which is configured as a legacy system or confined to one set;
numberPRBPairs which is pre-defined for each set or configured by the AN through a System Information Block 1 (SIB1), a Master Information Block (MIB) or a Radio Resource Control (RRC) message; or
resourceBlockAssignment which is defined as a legacy resource allocation pre-defined in a unit of N contiguous distributed/localized Virtual Resource Blocks (VRBs), wherein N is 4 or 8; or hard coded, or pre-defined, and is blindly detected together with the candidate SS.

6. The UE of claim 1, wherein the UESS and the CSS comprise two ePDCCH sets and a number of the candidate search spaces is equal to or less than that for legacy CSS PDCCHs,
for the AL equal to 64, the number of the candidate search spaces is generated based on the AL equal to 32 within one ePDCCH set and repeats in another ePDCCH set; and
for the AL less than 64, the number of the candidate search spaces is generated based on AL/2 within one ePDCCH set and repeats in another ePDCCH set or is alternatively generated based on AL within one ePDCCH set.

7. The UE of claim 1, wherein a maximum AL for a localized ePDCCH is enhanced to 32.

8. The UE of claim 1, wherein the UESS and the CSS comprise two ePDCCH sets, each containing 8 RBs, and the two ePDCCH sets are configured by the AN and comprise:
Maximum AL is 64 for the UE including one candidate SS for the AL equal to 64, two candidate SSs for the AL equal to 32, two/four candidate SSs for the AL equal to 16;
Maximum AL is 32 for the UE including two candidate SSs for the AL equal to 32, two/four candidate SSs for the AL equal to 16, two/four candidate SSs for an AL equal to 8;
Remaining candidates are equally divided for smaller AL; or
The ALs include 4 different levels or 5 different levels.

9. The UE of claim 1, wherein the candidate SS reuses two distributed ePDCCH sets,
wherein one candidate SS having an AL of 64 is added, and
wherein one candidate SS having a smaller AL is decreased by one.

10. The UE of claim 1, wherein the candidate SS focuses on an AL with 6 level ALs, and
wherein the 6 level ALs range from an AL equal to 2 to an AL equal to 64.

11. The UE of claim 1, wherein an enhanced Control Channel Element (eCCE) is numbered within one set from among the four ePDCCH sets, and a further eCCE (FeCCE) set from among the four ePDCCH sets is obtained by concatenating across multiple eCCEs.

12. The UE of claim 1, wherein a legacy PDCCHpdcch-candidateReductions parameter is reused in the UESS and the CSS, or alternatively a pdcch-candidateReductionAL6 parameter is introduced to the UESS and the CSS.

13. The UE of claim 1, wherein the transmission of DCI supports a legacy DCI for wide coverage enhancement (WCE) UE scheduling; and
wherein Format 1x is utilized for the WCE UE scheduling with the Format 1x comprising:
Format 1 for a single input multiple output (SIMO) PDSCH scheduling with non-contiguous Resource Allocation (RA);
Format 1A for a SIMO PDSCH scheduling with contiguous Resource Allocation (RA),
Format 1B for a close-loop single rank transmission with the contiguous RA; or
Format 1D for a compact scheduling of one PDSCH codeword with precoding and power offset information.

14. The UE of claim 1, wherein an enhanced Control Channel Element (eCCE) is numbered within one ePDCCH set from among the four ePDCCH sets, and a further eCCE (FeCCE) is obtained by concatenating across multiple eCCEs.

15. A method for operating a user equipment (UE), the method comprising:
receiving configuration information of a UE specific Search Space (UESS) and a Common Search Space (CSS) for enhanced Physical Downlink Control Channel (ePDCCH) from a radio-frequency (RF) circuitry, wherein the UESS and the CSS comprise four ePDCCH sets, the four ePDCCH sets being defined based upon aggregation levels (ALs), repetition levels (RLs), and numbers of blind decodings (#BDs),
wherein each ePDCCH set from among the four ePDCCH sets comprises 8 Resource Blocks (RBs), and
wherein the four ePDCCH sets are configured by an access node (AN) and comprise:
Two candidate Search Spaces (SSs) for an AL equal to 64,
Four candidate SSs for an AL equal to 32,
Four candidate SSs for an AL equal to 16,
Remaining candidate SSs are equally divided for smaller AL,
The ALs include 4 different levels or 5 different levels, and
For the AL equal to 64, two ePDCCH sets from among the four ePDCCH sets are associated by default, and within the two ePDCCH sets, the ePDCCH is generated based on the AL equal to 32 in one ePDCCH set from among the two ePDCCH sets, and repeated for another ePDCCH set from among the two ePDCCH sets; and
monitoring the UESS and the CSS for an ePDCCH transmission in accordance with one or more ePDCCH sets from among the four ePDCCH sets, and
wherein the configuration information comprises information for configuration of one or more of:
a candidate SS,
an RB for the UESS and the CSS,
a search space reduction, or
a transmission of Downlink Control Information (DCI).

16. The method of claim 15, wherein an enhanced Control Channel Element (eCCE) is numbered within one ePDCCH set from among the four ePDCCH sets, and a further eCCE (FeCCE) is obtained by concatenating across multiple eCCEs.

17. One or more non-transitory computer-readable media comprising instructions to, upon execution of the instructions by one or more processors of a user equipment (UE), cause the UE to:
receive configuration information of a UE specific Search Space (UESS) and a Common Search Space (CSS) for enhanced Physical Downlink Control Channel (ePDCCH) from a radio-frequency (RF) circuitry, wherein the UESS and the CSS comprise four ePDCCH sets, the four ePDCCH sets being defined based upon aggregation levels (ALs), repetition levels (RLs), and numbers of blind decodings (#BDs),
wherein each ePDCCH set from among the four ePDCCH sets comprises 8 Resource Blocks (RBs), and
wherein the four ePDCCH sets are configured by an access node (AN) and comprise:
Two candidate Search Spaces (SSs) for an AL equal to 64,
Four candidate SSs for an AL equal to 32,
Four candidate SSs for an AL equal to 16,
Remaining candidate SSs are equally divided for smaller AL,
The ALs include 4 different levels or 5 different levels, and
For the AL equal to 64, two ePDCCH sets from among the four ePDCCH sets are associated by default, and within the two ePDCCH sets, the ePDCCH is generated based on the AL equal to 32 in one ePDCCH set from among the two ePDCCH sets, and repeated for another ePDCCH set from among the two ePDCCH sets; and
monitor the UESS and the CSS for an ePDCCH transmission in accordance with one or more ePDCCH sets from among the four ePDCCH sets, and
wherein the configuration information comprises information for configuration of one or more of:
a candidate SS,
an RB for the UESS and the CSS,
a search space reduction, or
a transmission of Downlink Control Information (DCI).

18. The or more non-transitory computer-readable media of claim 17, wherein an enhanced Control Channel Element (eCCE) is numbered within one ePDCCH set from among the four ePDCCH sets, and a further eCCE (FeCCE) is obtained by concatenating across multiple eCCEs.

* * * * *